United States Patent
Briggs et al.

(10) Patent No.: US 12,223,528 B2
(45) Date of Patent: Feb. 11, 2025

(54) INTERACTIVE PRODUCT PLACEMENT SYSTEM AND METHOD THEREFOR

(71) Applicant: AiBUY Holdco, Inc., Plano, TX (US)

(72) Inventors: Christian Briggs, Austin, TX (US); Heath McBurnett, Austin, TX (US); Delfino Galindo, Jr., Laguna Niguel, CA (US); Freddy Knuth, Euless, TX (US)

(73) Assignee: AiBUY Holdco, Inc., Dallas, TX (US)

( * ) Notice: Subject to any disclaimer, the term of this patent is extended or adjusted under 35 U.S.C. 154(b) by 0 days.

(21) Appl. No.: 18/301,855

(22) Filed: Apr. 17, 2023

(65) Prior Publication Data

US 2024/0095783 A1 Mar. 21, 2024

Related U.S. Application Data

(63) Continuation of application No. 17/577,164, filed on Jan. 17, 2022, now Pat. No. 11,669,873, which is a
(Continued)

(51) Int. Cl.
*G06Q 30/0241* (2023.01)
*G06Q 30/0251* (2023.01)

(52) U.S. Cl.
CPC ..... *G06Q 30/0277* (2013.01); *G06Q 30/0251* (2013.01)

(58) Field of Classification Search
CPC .................. G06Q 30/0277; G06Q 30/0251
See application file for complete search history.

(56) References Cited

U.S. PATENT DOCUMENTS 5,264,933 A 11/1993 Rosser et al.
5,600,775 A 2/1997 King et al.
(Continued)

FOREIGN PATENT DOCUMENTS

CN 1809796 A 7/2006
CN 101286253 A 10/2008
(Continued)

OTHER PUBLICATIONS

"About Rich Media Guidelines Compliance: Over-the-Page Units," Jan. 7, 2007, 2 pages.
(Continued)

*Primary Examiner* — Nathan J Flynn
*Assistant Examiner* — Christine A Kurien
(74) *Attorney, Agent, or Firm* — COOLEY LLP

(57) ABSTRACT

A method for facilitating the order of commercial products in connection with the display of media content, whereby a player comprises a media production component and an interactive e-commerce component embedded therein. The player with the e-commerce component can be virally copied and propagated from one web page to any number of other web pages. A method for presenting advertisements for commercial products in video productions, whereby the commercial product is placed in the video production as an element of the video production. A viewer is enabled to interact with the video production to select the product. Information is then displayed about the selected product; and the viewer is enabled to purchase the selected product.

20 Claims, 16 Drawing Sheets

Related U.S. Application Data continuation of application No. 16/595,149, filed on Oct. 7, 2019, now Pat. No. 11,227,315, which is a continuation of application No. 16/034,900, filed on Jul. 13, 2018, now Pat. No. 10,438,249, which is a continuation of application No. 14/079,385, filed on Nov. 13, 2013, now Pat. No. 10,055,768, which is a continuation of application No. 12/787,505, filed on May 26, 2010, now abandoned, which is a continuation-in-part of application No. 12/363,713, filed on Jan. 30, 2009, now Pat. No. 8,312,486.

(60) Provisional application No. 61/024,829, filed on Jan. 30, 2008.

(56) References Cited

U.S. PATENT DOCUMENTS

| | | |
|---|---|---|
| 5,675,511 A | 10/1997 | Prasad et al. |
| 5,774,664 A | 6/1998 | Hidary et al. |
| 5,778,181 A | 7/1998 | Hidary et al. |
| 5,903,816 A | 5/1999 | Broadwin et al. |
| 5,929,849 A | 7/1999 | Kikinis |
| 6,006,257 A | 12/1999 | Slezak |
| 6,009,410 A | 12/1999 | LeMole et al. |
| 6,014,638 A | 1/2000 | Burge et al. |
| 6,018,768 A | 1/2000 | Ullman et al. |
| 6,058,430 A | 5/2000 | Kaplan |
| 6,141,060 A | 10/2000 | Honey et al. |
| 6,154,771 A | 11/2000 | Rangan et al. |
| 6,169,573 B1 | 1/2001 | Sampath-Kumar et al. |
| 6,173,317 B1 | 1/2001 | Chaddha et al. |
| 6,182,116 B1 | 1/2001 | Namma et al. |
| 6,188,398 B1 | 2/2001 | Collins-Rector et al. |
| 6,233,682 B1 | 5/2001 | Fritsch |
| 6,240,555 B1 | 5/2001 | Shoff et al. |
| 6,263,505 B1 | 7/2001 | Walker et al. |
| 6,275,989 B1 | 8/2001 | Broadwin et al. |
| 6,282,713 B1 | 8/2001 | Kitsukawa et al. |
| 6,321,209 B1 | 11/2001 | Pasquali |
| 6,330,595 B1 | 12/2001 | Ullman et al. |
| 6,357,042 B2 | 3/2002 | Srinivasan et al. |
| 6,496,981 B1 | 12/2002 | Wistendahl et al. |
| 6,510,557 B1 | 1/2003 | Thrift |
| 6,536,041 B1 | 3/2003 | Knudson et al. |
| 6,553,566 B1 | 4/2003 | Grant et al. |
| 6,564,380 B1 | 5/2003 | Murphy |
| 6,628,307 B1 | 9/2003 | Fair |
| 6,757,906 B1 | 6/2004 | Look et al. |
| 6,766,528 B1 | 7/2004 | Kim et al. |
| 6,792,618 B1 | 9/2004 | Bendinelli et al. |
| 6,847,778 B1 | 1/2005 | Vallone et al. |
| 6,857,010 B1 | 2/2005 | Cuijpers et al. |
| 6,910,049 B2 | 6/2005 | Fenton et al. |
| 6,912,726 B1 | 6/2005 | Chen et al. |
| 6,941,575 B2 | 9/2005 | Allen |
| 6,976,028 B2 | 12/2005 | Fenton et al. |
| 6,990,498 B2 | 1/2006 | Fenton et al. |
| 7,000,242 B1 | 2/2006 | Haber |
| 7,017,173 B1 | 3/2006 | Armstrong et al. |
| 7,072,683 B2 | 7/2006 | King et al. |
| 7,076,792 B2 | 7/2006 | Zigmond et al. |
| 7,120,871 B1 | 10/2006 | Harrington |
| 7,133,837 B1 | 11/2006 | Barnes, Jr. |
| 7,136,853 B1 | 11/2006 | Kohda et al. |
| 7,146,631 B1 | 12/2006 | Tanaka et al. |
| 7,158,676 B1 | 1/2007 | Rainsford |
| 7,162,263 B2 | 1/2007 | King et al. |
| 7,168,051 B2 | 1/2007 | Robinson et al. |
| 7,168,087 B2 | 1/2007 | Goldberg et al. |
| 7,188,186 B1 | 3/2007 | Meyer et al. |
| 7,203,909 B1 | 4/2007 | Horvitz et al. |
| 7,207,057 B1 | 4/2007 | Rowe |
| 7,222,163 B1 | 5/2007 | Girouard et al. |
| 7,231,651 B2 | 6/2007 | Pong |
| 7,243,139 B2 | 7/2007 | Ullman et al. |
| 7,254,622 B2 | 8/2007 | Nomura et al. |
| 7,257,774 B2 | 8/2007 | Denoue et al. |
| 7,269,837 B1 | 9/2007 | Redling et al. |
| 7,331,057 B2 | 2/2008 | Eldering et al. |
| 7,353,186 B2 | 4/2008 | Kobayashi |
| 7,355,633 B2 | 4/2008 | Kurosawa et al. |
| 7,409,437 B2 | 8/2008 | Ullman et al. |
| 7,412,406 B2 | 8/2008 | Rosenberg |
| 7,432,768 B2 | 10/2008 | Han et al. |
| 7,444,659 B2 | 10/2008 | Lemmons |
| 7,464,344 B1 | 12/2008 | Carmichael et al. |
| 7,485,397 B2 | 2/2009 | Eck et al. |
| 7,487,112 B2 | 2/2009 | Barnes, Jr. |
| 7,509,340 B2 | 3/2009 | Fenton et al. |
| 7,539,738 B2 | 5/2009 | Stuckman et al. |
| 7,559,017 B2 | 7/2009 | Datar et al. |
| 7,559,034 B1 | 7/2009 | Paperny et al. |
| 7,574,381 B1 | 8/2009 | Lin-Hendel |
| 7,577,978 B1 | 8/2009 | Wistendahl et al. |
| 7,593,965 B2 | 9/2009 | Gabriel |
| 7,600,241 B2 | 10/2009 | Zigmond et al. |
| 7,607,107 B2 | 10/2009 | Iten et al. |
| 7,613,691 B2 | 11/2009 | Finch |
| 7,614,013 B2 | 11/2009 | Dollar et al. |
| 7,620,914 B2 | 11/2009 | Li et al. |
| 7,624,416 B1 | 11/2009 | Vandermolen et al. |
| 7,631,327 B2 | 12/2009 | Dempski et al. |
| 7,653,923 B2 | 1/2010 | Flickinger |
| 7,661,121 B2 | 2/2010 | Smith et al. |
| 7,664,678 B1 | 2/2010 | Haber |
| 7,673,017 B2 | 3/2010 | Kim et al. |
| 7,691,666 B2 | 4/2010 | Levy et al. |
| 7,698,178 B2 | 4/2010 | Chu |
| 7,721,307 B2 | 5/2010 | Hendricks et al. |
| 7,735,101 B2 | 6/2010 | Lanza et al. |
| 7,739,596 B2 | 6/2010 | Clarke-Martin et al. |
| 7,750,343 B2 | 7/2010 | Choi et al. |
| 7,756,758 B2 | 7/2010 | Johnson et al. |
| 7,769,827 B2 | 8/2010 | Girouard et al. |
| 7,769,830 B2 | 8/2010 | Stuckman et al. |
| 7,773,093 B2 | 8/2010 | Bates et al. |
| 7,774,161 B2 | 8/2010 | Tischer |
| 7,774,815 B1 | 8/2010 | Allen |
| 7,800,102 B2 | 9/2010 | Park et al. |
| 7,804,506 B2 | 9/2010 | Bates et al. |
| 7,818,763 B2 | 10/2010 | Sie et al. |
| 7,823,058 B2 | 10/2010 | Pea et al. |
| 7,840,415 B2 | 11/2010 | Schifone |
| 7,870,592 B2 | 1/2011 | Hudson et al. |
| 7,885,951 B1 | 2/2011 | Rothschild |
| 7,899,719 B2 | 3/2011 | Lin-Hendel |
| 7,912,753 B2 | 3/2011 | Struble |
| 7,923,722 B2 | 4/2011 | Ryu et al. |
| 7,925,973 B2 | 4/2011 | Allaire et al. |
| 7,946,492 B2 | 5/2011 | Rohs |
| 7,975,020 B1 | 7/2011 | Green et al. |
| 7,975,062 B2 | 7/2011 | Krikorian et al. |
| 7,979,877 B2 | 7/2011 | Huber et al. |
| 7,982,216 B2 | 7/2011 | Imai |
| 7,987,098 B2 | 7/2011 | Schifone |
| 7,987,483 B1 | 7/2011 | Des Jardins |
| 8,001,116 B2 | 8/2011 | Cope |
| 8,001,577 B2 | 8/2011 | Fries |
| 8,006,265 B2 | 8/2011 | Redling et al. |
| 8,010,408 B2 | 8/2011 | Rubinstein et al. |
| 8,032,421 B1 | 10/2011 | Ho et al. |
| 8,055,688 B2 | 11/2011 | Giblin |
| 8,091,103 B2 | 1/2012 | Cope |
| 8,108,257 B2 | 1/2012 | Sengamedu |
| 8,112,702 B2 | 2/2012 | Badoiu et al. |
| 8,113,844 B2 | 2/2012 | Huang et al. |
| 8,117,281 B2 | 2/2012 | Robinson et al. |
| 8,122,480 B2 | 2/2012 | Sholtis |
| 8,132,486 B1 | 3/2012 | Calvert |
| 8,140,973 B2 | 3/2012 | Sandquist et al. |
| 8,141,112 B2 | 3/2012 | Cope et al. |
| 8,151,182 B2 | 4/2012 | Datar et al. |
| 8,151,295 B1 | 4/2012 | Eldering et al. |

(56) References Cited

U.S. PATENT DOCUMENTS

| | | |
|---|---|---|
| 8,181,212 B2 | 5/2012 | Sigal |
| 8,196,162 B2 | 6/2012 | Van De Klashorst |
| 8,234,218 B2 | 7/2012 | Robinson et al. |
| 8,244,830 B2 | 8/2012 | Robinson et al. |
| 8,310,443 B1 | 11/2012 | Pan |
| 8,312,486 B1 | 11/2012 | Briggs et al. |
| 8,316,450 B2 | 11/2012 | Robinson et al. |
| 8,341,152 B1 | 12/2012 | Bates |
| 8,356,077 B2 | 1/2013 | Robinson et al. |
| 8,365,081 B1 | 1/2013 | Amacker et al. |
| 8,413,182 B2 | 4/2013 | Bill |
| 8,433,611 B2 | 4/2013 | Lax et al. |
| 8,438,646 B2 | 5/2013 | Sidi |
| 8,458,053 B1 | 6/2013 | Buron et al. |
| 8,468,562 B2 | 6/2013 | Miller et al. |
| 8,533,753 B2 | 9/2013 | Briggs et al. |
| 8,549,555 B2 | 10/2013 | Briggs et al. |
| 8,615,474 B2 | 12/2013 | Avedissian et al. |
| 8,635,169 B2 | 1/2014 | Avedissian et al. |
| 8,639,621 B1 | 1/2014 | Ellis et al. |
| 8,645,214 B2 | 2/2014 | Hipolito et al. |
| 8,645,217 B2 | 2/2014 | Siegel et al. |
| 8,645,991 B2 | 2/2014 | McIntire et al. |
| 8,655,146 B2 | 2/2014 | Bennett et al. |
| 8,666,818 B2 | 3/2014 | DeVree |
| 8,682,809 B2 | 3/2014 | Avedissian et al. |
| 8,707,185 B2 | 4/2014 | Robinson et al. |
| 8,708,223 B2 | 4/2014 | Gates et al. |
| 8,725,826 B2 | 5/2014 | Robinson et al. |
| 8,745,657 B2 | 6/2014 | Chalozin et al. |
| 8,752,083 B2 | 6/2014 | Geer, III et al. |
| 8,769,016 B2 | 7/2014 | Jakobson |
| 8,769,053 B2 | 7/2014 | Spitz et al. |
| 8,769,584 B2 | 7/2014 | Neumeier et al. |
| 8,782,690 B2 | 7/2014 | Briggs et al. |
| 8,813,118 B2 | 8/2014 | Bhatnagar et al. |
| 8,813,132 B2 | 8/2014 | Andrews, II et al. |
| 8,843,959 B2 | 9/2014 | McMaster et al. |
| 8,893,173 B2 | 11/2014 | Briggs et al. |
| 8,918,804 B2 | 12/2014 | Sinha et al. |
| 9,036,043 B2 | 5/2015 | Segal |
| 9,332,302 B2 | 5/2016 | Briggs et al. |
| 9,338,499 B2 | 5/2016 | Briggs et al. |
| 9,338,500 B2 | 5/2016 | Briggs et al. |
| 9,344,754 B2 | 5/2016 | Briggs et al. |
| 9,351,032 B2 | 5/2016 | Briggs et al. |
| 9,674,584 B2 | 6/2017 | Briggs et al. |
| 9,986,305 B2 | 5/2018 | Briggs et al. |
| 10,055,768 B2 | 8/2018 | Briggs et al. |
| 10,425,698 B2 | 9/2019 | Briggs et al. |
| 10,438,249 B2 | 10/2019 | Briggs et al. |
| 11,227,315 B2 | 1/2022 | Briggs et al. |
| 11,669,873 B2 | 6/2023 | Briggs et al. |
| 2002/0006266 A1 | 1/2002 | Yoon et al. |
| 2002/0007493 A1 | 1/2002 | Butler et al. |
| 2002/0056123 A1 | 5/2002 | Liwerant et al. |
| 2002/0056136 A1 | 5/2002 | Wistendahl et al. |
| 2002/0059196 A1 | 5/2002 | I'Anson et al. |
| 2002/0062481 A1 | 5/2002 | Slaney et al. |
| 2002/0066103 A1 | 5/2002 | Gagnon et al. |
| 2002/0073167 A1 | 6/2002 | Powell et al. |
| 2002/0075332 A1 | 6/2002 | Geilfuss, Jr. et al. |
| 2002/0083447 A1 | 6/2002 | Heron et al. |
| 2002/0083469 A1 | 6/2002 | Jeannin et al. |
| 2002/0087978 A1 | 7/2002 | Nicholson et al. |
| 2002/0112249 A1 | 8/2002 | Hendricks et al. |
| 2002/0126990 A1 | 9/2002 | Rasmussen et al. |
| 2002/0199181 A1 | 12/2002 | Allen |
| 2003/0018966 A1 | 1/2003 | Cook et al. |
| 2003/0023490 A1 | 1/2003 | Lenyon et al. |
| 2003/0028873 A1* | 2/2003 | Lemmons ........ H04N 21/23418 |
| | | 348/588 |
| 2003/0040962 A1 | 2/2003 | Lewis |
| 2003/0055723 A1 | 3/2003 | English |
| 2003/0079224 A1 | 4/2003 | Komar et al. |
| 2003/0084441 A1 | 5/2003 | Hunt |
| 2003/0115598 A1 | 6/2003 | Pantoja |
| 2003/0135563 A1 | 7/2003 | Bodin et al. |
| 2003/0149983 A1 | 8/2003 | Markel |
| 2003/0163832 A1 | 8/2003 | Tsuria et al. |
| 2003/0228615 A1 | 12/2003 | Rossi et al. |
| 2003/0231851 A1 | 12/2003 | Rantala et al. |
| 2004/0012717 A1 | 1/2004 | Sprague et al. |
| 2004/0021684 A1 | 2/2004 | Millner |
| 2004/0021685 A1 | 2/2004 | Denoue et al. |
| 2004/0059783 A1 | 3/2004 | Kazui et al. |
| 2004/0075670 A1 | 4/2004 | Bezine et al. |
| 2004/0080625 A1 | 4/2004 | Kurosawa et al. |
| 2004/0125133 A1 | 7/2004 | Pea et al. |
| 2004/0153385 A1 | 8/2004 | Allibhoy et al. |
| 2004/0215534 A1 | 10/2004 | Gautier et al. |
| 2005/0005303 A1 | 1/2005 | Barone et al. |
| 2005/0022226 A1 | 1/2005 | Ackley et al. |
| 2005/0029514 A1 | 2/2005 | Moriya |
| 2005/0033656 A1 | 2/2005 | Wang et al. |
| 2005/0076372 A1 | 4/2005 | Moore et al. |
| 2005/0091107 A1 | 4/2005 | Blum |
| 2005/0094031 A1 | 5/2005 | Tecot et al. |
| 2005/0097622 A1 | 5/2005 | Zigmond et al. |
| 2005/0144164 A1 | 6/2005 | Gorak et al. |
| 2005/0234958 A1 | 10/2005 | Sipusic et al. |
| 2005/0246752 A1 | 11/2005 | Liwerant et al. |
| 2006/0009243 A1 | 1/2006 | Dahan et al. |
| 2006/0010476 A1 | 1/2006 | Kelly et al. |
| 2006/0047779 A1 | 3/2006 | Deshpande |
| 2006/0087987 A1 | 4/2006 | Witt et al. |
| 2006/0089843 A1 | 4/2006 | Flather |
| 2006/0117356 A1 | 6/2006 | Jojic et al. |
| 2006/0136305 A1 | 6/2006 | Fitzsimmons et al. |
| 2006/0202191 A1 | 9/2006 | Gerlach et al. |
| 2006/0212794 A1 | 9/2006 | Evans et al. |
| 2006/0242016 A1 | 10/2006 | Chenard |
| 2006/0256133 A1 | 11/2006 | Rosenberg |
| 2006/0264209 A1 | 11/2006 | Atkinson et al. |
| 2006/0265657 A1* | 11/2006 | Gilley ................ H04N 21/4402 |
| | | 705/14.69 |
| 2006/0276266 A1 | 12/2006 | Sullivan |
| 2007/0003223 A1 | 1/2007 | Armstrong et al. |
| 2007/0005795 A1 | 1/2007 | Gonzalez |
| 2007/0030080 A1 | 2/2007 | Han et al. |
| 2007/0033531 A1 | 2/2007 | Marsh |
| 2007/0046687 A1 | 3/2007 | Soroushi et al. |
| 2007/0073553 A1 | 3/2007 | Flinn et al. |
| 2007/0087489 A1 | 4/2007 | Park et al. |
| 2007/0091093 A1 | 4/2007 | Li et al. |
| 2007/0091095 A1 | 4/2007 | Chen |
| 2007/0106646 A1 | 5/2007 | Stern et al. |
| 2007/0150360 A1 | 6/2007 | Getz |
| 2007/0157228 A1* | 7/2007 | Bayer .............. H04N 21/26208 |
| | | 348/E7.071 |
| 2007/0180461 A1 | 8/2007 | Hilton |
| 2007/0183430 A1 | 8/2007 | Asmussen |
| 2007/0204308 A1 | 8/2007 | Nicholas et al. |
| 2007/0239546 A1 | 10/2007 | Blum et al. |
| 2007/0241327 A1 | 10/2007 | Kim et al. |
| 2007/0242066 A1 | 10/2007 | Levy Rosenthal |
| 2007/0245243 A1 | 10/2007 | Lanza et al. |
| 2007/0250899 A1 | 10/2007 | Rhodes et al. |
| 2007/0250901 A1 | 10/2007 | McIntire et al. |
| 2007/0266399 A1* | 11/2007 | Sidi ..................... H04L 65/60 |
| | | 348/E7.071 |
| 2007/0271149 A1 | 11/2007 | Siegel et al. |
| 2007/0288518 A1 | 12/2007 | Crigler et al. |
| 2007/0300263 A1 | 12/2007 | Barton et al. |
| 2007/0300280 A1 | 12/2007 | Turner et al. |
| 2008/0005999 A1 | 1/2008 | Pervan |
| 2008/0012010 A1 | 1/2008 | Myung-Seok et al. |
| 2008/0028047 A1 | 1/2008 | Girouard et al. |
| 2008/0066099 A1 | 3/2008 | Brodersen et al. |
| 2008/0066107 A1 | 3/2008 | Moonka et al. |
| 2008/0097843 A1 | 4/2008 | Menon et al. |
| 2008/0098425 A1 | 4/2008 | Welch |
| 2008/0109306 A1 | 5/2008 | Maigret et al. |
| 2008/0109844 A1 | 5/2008 | Baldeschwieler et al. |

(56) References Cited

U.S. PATENT DOCUMENTS

| | | |
|---|---|---|
| 2008/0114656 A1 | 5/2008 | Jersey et al. |
| 2008/0115161 A1 | 5/2008 | Kurzion |
| 2008/0126191 A1 | 5/2008 | Schiavi |
| 2008/0126226 A1 | 5/2008 | Popkiewicz et al. |
| 2008/0126949 A1 | 5/2008 | Sharma |
| 2008/0148283 A1 | 6/2008 | Allen et al. |
| 2008/0149921 A1 | 6/2008 | Choi et al. |
| 2008/0155590 A1 | 6/2008 | Soukup et al. |
| 2008/0162343 A1 | 7/2008 | Bedier |
| 2008/0163283 A1 | 7/2008 | Tan et al. |
| 2008/0177627 A1 | 7/2008 | Cefail |
| 2008/0177630 A1 | 7/2008 | Maghfourian et al. |
| 2008/0187279 A1 | 8/2008 | Gilley et al. |
| 2008/0235085 A1 | 9/2008 | Kovinsky et al. |
| 2008/0249834 A1 | 10/2008 | Zigmond et al. |
| 2008/0250445 A1 | 10/2008 | Zigmond et al. |
| 2008/0255934 A1 | 10/2008 | Leventhal et al. |
| 2008/0263583 A1 | 10/2008 | Heath |
| 2008/0276266 A1 | 11/2008 | Huchital et al. |
| 2008/0276272 A1 | 11/2008 | Rajaraman et al. |
| 2008/0281685 A1 | 11/2008 | Jaffe et al. |
| 2008/0281689 A1 | 11/2008 | Blinnikka et al. |
| 2008/0294694 A1 | 11/2008 | Maghfourian et al. |
| 2008/0296568 A1 | 12/2008 | Ryu et al. |
| 2008/0306999 A1 | 12/2008 | Finger et al. |
| 2008/0307310 A1 | 12/2008 | Segal et al. |
| 2008/0319852 A1* | 12/2008 | Gardner ............ G06Q 30/0241 705/14.4 |
| 2008/0319856 A1 | 12/2008 | Zito et al. |
| 2009/0006191 A1 | 1/2009 | Arankalle et al. |
| 2009/0013347 A1 | 1/2009 | Ahanger et al. |
| 2009/0018904 A1 | 1/2009 | Shipman et al. |
| 2009/0024617 A1 | 1/2009 | Cope |
| 2009/0031382 A1 | 1/2009 | Cope |
| 2009/0032007 A1 | 2/2009 | Satou |
| 2009/0032809 A1 | 2/2009 | Kim et al. |
| 2009/0043674 A1 | 2/2009 | Minsky et al. |
| 2009/0070206 A1 | 3/2009 | Sengamedu |
| 2009/0077598 A1 | 3/2009 | Watson et al. |
| 2009/0083815 A1 | 3/2009 | McMaster et al. |
| 2009/0089146 A1 | 4/2009 | Teterin |
| 2009/0092374 A1 | 4/2009 | Kulas |
| 2009/0094339 A1 | 4/2009 | Allen et al. |
| 2009/0094555 A1 | 4/2009 | Viitala |
| 2009/0106104 A1 | 4/2009 | Upendran et al. |
| 2009/0119169 A1 | 5/2009 | Chandratillake et al. |
| 2009/0132349 A1 | 5/2009 | Berkley et al. |
| 2009/0148843 A1 | 6/2009 | Schulze-Koops et al. |
| 2009/0150947 A1 | 6/2009 | Soderstrom |
| 2009/0157500 A1 | 6/2009 | Ames et al. |
| 2009/0158322 A1 | 6/2009 | Cope et al. |
| 2009/0172793 A1 | 7/2009 | Newstadt et al. |
| 2009/0199230 A1 | 8/2009 | Kumar et al. |
| 2009/0210790 A1 | 8/2009 | Thomas |
| 2009/0222851 A1 | 9/2009 | Talmi |
| 2009/0248546 A1 | 10/2009 | Norris et al. |
| 2009/0249185 A1 | 10/2009 | Datar et al. |
| 2009/0259563 A1 | 10/2009 | Ruhnke et al. |
| 2009/0265255 A1 | 10/2009 | Jackson et al. |
| 2009/0274437 A1 | 11/2009 | Stiers et al. |
| 2009/0276805 A1 | 11/2009 | Andrews, II et al. |
| 2009/0320073 A1 | 12/2009 | Reisman |
| 2009/0328113 A1 | 12/2009 | Van De Klashorst |
| 2010/0030578 A1 | 2/2010 | Siddique et al. |
| 2010/0114983 A1 | 5/2010 | Robert et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0161425 A1 | 6/2010 | Sideman |
| 2010/0177122 A1 | 7/2010 | Netter et al. |
| 2010/0199182 A1 | 8/2010 | Lanza et al. |
| 2010/0223107 A1 | 9/2010 | Kim et al. |
| 2010/0247061 A1 | 9/2010 | Bennett et al. |
| 2010/0279766 A1 | 11/2010 | Pliska et al. |
| 2010/0283827 A1 | 11/2010 | Bustamante |
| 2010/0287580 A1 | 11/2010 | Harding et al. |
| 2010/0299616 A1 | 11/2010 | Chen et al. |
| 2010/0306805 A1 | 12/2010 | Neumeier et al. |
| 2010/0332329 A1 | 12/2010 | Roberts et al. |
| 2011/0001758 A1 | 1/2011 | Chalozin et al. |
| 2011/0004517 A1 | 1/2011 | Soto et al. |
| 2011/0016487 A1 | 1/2011 | Chalozin et al. |
| 2011/0022471 A1 | 1/2011 | Brueck et al. |
| 2011/0052144 A1 | 3/2011 | Abbas et al. |
| 2011/0071865 A1 | 3/2011 | Leeds et al. |
| 2011/0106879 A1 | 5/2011 | Sung et al. |
| 2011/0107363 A1 | 5/2011 | Sanghavi |
| 2011/0125594 A1 | 5/2011 | Brown et al. |
| 2011/0133176 A1 | 6/2011 | Lee et al. |
| 2011/0166944 A1 | 7/2011 | Tkachev |
| 2011/0173300 A1 | 7/2011 | Levy et al. |
| 2011/0191178 A1 | 8/2011 | Newberg et al. |
| 2011/0191809 A1 | 8/2011 | Briggs et al. |
| 2011/0231260 A1 | 9/2011 | Price |
| 2011/0238755 A1 | 9/2011 | Khan et al. |
| 2011/0251897 A1 | 10/2011 | Litvack et al. |
| 2011/0307397 A1 | 12/2011 | Benmbarek |
| 2012/0030704 A1 | 2/2012 | Schiller et al. |
| 2012/0079021 A1 | 3/2012 | Roman et al. |
| 2012/0158511 A1 | 6/2012 | Lucero et al. |
| 2012/0159541 A1 | 6/2012 | Carton et al. |
| 2012/0185355 A1 | 7/2012 | Kilroy |
| 2012/0192104 A1 | 7/2012 | Robbin et al. |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0296738 A1 | 11/2012 | Leeder |
| 2012/0296782 A1 | 11/2012 | Tsai et al. |
| 2012/0304065 A1 | 11/2012 | Cai |
| 2012/0307152 A1 | 12/2012 | Zaslavsky et al. |
| 2013/0014137 A1 | 1/2013 | Bhatia et al. |
| 2013/0014155 A1 | 1/2013 | Clarke et al. |
| 2013/0054757 A1 | 2/2013 | Spitz et al. |
| 2013/0097023 A1 | 4/2013 | Yerli |
| 2013/0110608 A1 | 5/2013 | Cassidy et al. |
| 2013/0117131 A1 | 5/2013 | Robinson et al. |
| 2013/0144903 A1 | 6/2013 | Andrews, II et al. |
| 2013/0151352 A1 | 6/2013 | Tsai et al. |
| 2013/0152123 A1 | 6/2013 | Briggs et al. |
| 2013/0166382 A1 | 6/2013 | Cassidy et al. |
| 2013/0174007 A1 | 7/2013 | Demarco et al. |
| 2013/0183021 A1 | 7/2013 | Osman |
| 2013/0211891 A1 | 8/2013 | Daniel et al. |
| 2013/0212611 A1 | 8/2013 | Van Aacken et al. |
| 2013/0215116 A1 | 8/2013 | Siddique et al. |
| 2013/0218964 A1 | 8/2013 | Jakobson |
| 2013/0228615 A1 | 9/2013 | Gates et al. |
| 2013/0254018 A1 | 9/2013 | Rao |
| 2013/0290550 A1 | 10/2013 | Bangalore et al. |
| 2014/0006156 A1 | 1/2014 | Theophilis |
| 2014/0019860 A1 | 1/2014 | Sathish et al. |
| 2014/0032366 A1 | 1/2014 | Spitz et al. |
| 2014/0095330 A1 | 4/2014 | Briggs et al. |
| 2014/0101551 A1 | 4/2014 | Sherrets et al. |
| 2014/0115631 A1 | 4/2014 | Mak |
| 2014/0181208 A1 | 6/2014 | Robinson et al. |
| 2014/0208235 A1 | 7/2014 | Robinson et al. |
| 2014/0250211 A1 | 9/2014 | Spitz et al. |
| 2014/0254942 A1 | 9/2014 | Liu et al. |
| 2014/0282700 A1 | 9/2014 | Briggs et al. |
| 2014/0282724 A1 | 9/2014 | Chalozin et al. |
| 2014/0304730 A1 | 10/2014 | Lettau et al. |
| 2014/0359671 A1 | 12/2014 | Andrews et al. |
| 2015/0039468 A1 | 2/2015 | Spitz et al. |
| 2015/0073919 A1 | 3/2015 | Spitz et al. |
| 2015/0074710 A1 | 3/2015 | Spitz et al. |
| 2015/0074711 A1 | 3/2015 | Spitz et al. |
| 2015/0092111 A1 | 4/2015 | Spitz et al. |
| 2015/0095455 A1 | 4/2015 | Spitz et al. |
| 2015/0189355 A1 | 7/2015 | Korbecki |
| 2015/0264417 A1 | 9/2015 | Spitz et al. |
| 2016/0029070 A1 | 1/2016 | Briggs et al. |
| 2016/0029071 A1 | 1/2016 | Briggs et al. |
| 2016/0029072 A1 | 1/2016 | Briggs et al. |

(56) References Cited

U.S. PATENT DOCUMENTS

| | | |
|---|---|---|
| 2016/0029073 A1 | 1/2016 | Briggs et al. |
| 2016/0029090 A1 | 1/2016 | Briggs et al. |
| 2016/0191981 A1 | 6/2016 | Briggs et al. |
| 2016/0191982 A1 | 6/2016 | Briggs et al. |
| 2016/0191983 A1 | 6/2016 | Briggs et al. |
| 2016/0191984 A1 | 6/2016 | Briggs et al. |
| 2016/0192031 A1 | 6/2016 | Briggs et al. |
| 2018/0338188 A1 | 11/2018 | Briggs et al. |
| 2019/0147502 A1 | 5/2019 | Briggs et al. |
| 2020/0111136 A1 | 4/2020 | Briggs et al. |
| 2022/0391951 A1 | 12/2022 | Briggs et al. |

FOREIGN PATENT DOCUMENTS

| | | |
|---|---|---|
| CN | 101477669 A | 7/2009 |
| CN | 101647035 A | 2/2010 |
| CN | 101699505 A | 4/2010 |
| EA | 011996 B1 | 6/2009 |
| EP | 2045730 A1 | 4/2009 |
| RU | 2355043 C1 | 5/2009 |
| RU | 89738 U1 | 12/2009 |
| WO | WO-0169364 A2 | 9/2001 |
| WO | WO-0191869 A2 | 12/2001 |
| WO | WO-2005036875 A1 | 4/2005 |
| WO | WO-2006062105 A1 | 6/2006 |
| WO | WO-2007131132 A2 | 11/2007 |
| WO | WO-2008016634 A2 | 2/2008 |
| WO | WO-2009012580 A1 | 1/2009 |
| WO | WO-2009137368 A2 | 11/2009 |
| WO | WO-2011149491 A1 | 12/2011 |
| WO | WO-2013033239 A1 | 3/2013 |
| WO | WO-2013192557 A2 | 12/2013 |
| WO | WO-2015013117 A1 | 1/2015 |
| WO | WO-2015038795 A1 | 3/2015 |
| WO | WO-2015038798 A1 | 3/2015 |
| WO | WO-2015038802 A1 | 3/2015 |
| WO | WO-2015048375 A1 | 4/2015 |
| WO | WO-2015048377 A1 | 4/2015 |
| WO | WO-2015054644 A1 | 4/2015 |
| WO | WO-2015131126 A1 | 9/2015 |
| WO | WO-2015138612 A1 | 9/2015 |

OTHER PUBLICATIONS

"Akamai for Media & Entertainment," Akamai Technologies, Inc., 2007, 38 pages.
Balog, J., How to extract frames of a video, [online], Jun. 8, 2011, [retrieved from the internet on Nov. 17, 2015], 6 pages.
"Broadband Ad Creative Guidelines," Dec. 31, 2006, 3 pages.
Chave, P., "DPI platforms create ad insertion growth and revenue for broadcasters," TVTechnology [online], May 1, 2007, [retrieved from the internet on Feb. 24, 2016], 11 pages.
Cinsay, Inc. v. Joyus, Inc. and Brightcove, Inc., Case No. 3:13-cv-3628-K, "Appendix In Support of Plaintiff's Markman Brief in Support of Proposed Claim Constructions," filed in the United States District Court, Northern District of Texas, Dallas Division, on Jun. 19, 2014, 3 pages.
Cinsay, Inc. v. Joyus, Inc. and Brightcove, Inc., Case No. 3:13-cv-3628-K, "Defendants Joyus, Inc.'s and Brightcove, Inc.'s Opening Claim Construction Brief," filed in the United States District Court, Northern District of Texas, Dallas Division, on Jun. 19, 2014, 33 pages.
Cinsay, Inc. v. Joyus, Inc. and Brightcove, Inc., Case No. 3:13-cv-3628-K, "Exhibit 1, Declaration of Jennifer Beth Ingram, and Exhibits A-D ro Plaintiff's Markman Brief in Support of Proposed Claim Constructions," filed in the United States District Court, Northern District of Texas, Dallas Division, on Jun. 19, 2014, 57 pages.
Cinsay, Inc. v. Joyus, Inc. and Brightcove, Inc., Case No. 3:13-cv-3628-K, "Exhibits E-J to Plaintiff's Markman Brief in Support of Proposed Claim Constructions," filed in the United States District Court, Northern District of Texas, Dallas Division, on Jun. 19, 2014, 22 pages.
Cinsay, Inc. v. Joyus, Inc. and Brightcove, Inc., Case No. 3:13-cv-3628-K, "Index of Appendix in Support of Defendants Joyus, Inc.'s and Brightcove, Inc.'s Opening Claim Construction Brief," filed in the United States District Court, Northern District of Texas, Dallas Division, on Jun. 19, 2014, 52 pages.
Cinsay, Inc. v. Joyus, Inc. and Brightcove, Inc., Case No. 3:13-cv-3628-K, "Order Dismissing All Claims and Counterclaims," United States District Court, Northern District of Texas, Dallas Division, dated Aug. 14, 2014, 1 page.
Cinsay, Inc. v. Joyus, Inc. and Brightcove, Inc., Case No. 3:13-cv-3628-K, "Plaintiff Cinsay, Inc.'s Markman Brief in Support of Proposed Claim Constructions," filed in the United States District Court, Northern District of Texas, Dallas Division, on Jun. 19, 2014, 34 pages.
Cinsay, Inc. v. Joyus, Inc., Case No. 3:13-cv-3628-K, "Amended Joint Claim Construction and Prehearing Statement," filed in the United States District Court, Northern District of Texas, Dallas Division, on Oct. 1, 2014, 6 pages.
Cinsay, Inc. v. Joyus, Inc., Case No. 3:13-cv-3628-K, "Appendix in Support of Plaintiff's Response to Defendant's Motion for Judgment on The Pleadings," filed in the United States District Court, Northern District of Texas, Dallas Division, on Feb. 24, 2015, 2 pages.
Cinsay, Inc. v. Joyus, Inc., Case No. 3:13-cv-3628-K, "Defendant Joyus, Inc.'s Motion for Judgment on The Pleadings," filed in the United States District Court, Northern District of Texas, Dallas Division, on Jan. 26, 2015, 24 pages.
Cinsay, Inc. v. Joyus, Inc., Case No. 3:13-cv-3628-K, "Exhibit A to Amended Joint Claim Construction and Prehearing Statement," filed in the United States District Court, Northern District of Texas, Dallas Division, on Oct. 1, 2014, 2 pages.
Cinsay, Inc. v. Joyus, Inc., Case No. 3:13-cv-3628-K, "Exhibit A to Plaintiff's Response to Defendant's Motion for Judgment on The Pleadings," filed in the United States District Court, Northern District of Texas, Dallas Division, on Feb. 24, 2015, 14 pages.
Cinsay, Inc. v. Joyus, Inc., Case No. 3:13-cv-3628-K, "Exhibit B to Amended Joint Claim Construction and Prehearing Statement," filed in the United States District Court, Northern District of Texas, Dallas Division, on Oct. 1, 2014, 8 pages.
Cinsay, Inc. v. Joyus, Inc., Case No. 3:13-cv-3628-K, "Exhibit B to Plaintiff's Response to Defendant's Motion for Judgment on The Pleadings," filed in the United States District Court, Northern District of Texas, Dallas Division, on Feb. 24, 2015, 12 pages.
Cinsay, Inc. v. Joyus, Inc., Case No. 3:13-cv-3628-K, "Exhibit C to Plaintiff's Response to Defendant's Motion for Judgment on The Pleadings," filed in the United States District Court, Northern District of Texas, Dallas Division, on Feb. 24, 2015, 13 pages.
Cinsay, Inc. v. Joyus, Inc., Case No. 3:13-cv-3628-K, "Markman Memorandum Opinion and Order," United States District Court, Northern District of Texas, Dallas Division, dated Mar. 4, 2015, 38 pages.
Cinsay, Inc. v. Joyus, Inc., Case No. 3:13-cv-3628-K, "Order of Dismissal Without Prejudice," dated Apr. 7, 2015, and "Order Denying Defendant's Motion for Judgment on The Pleadings," dated Mar. 25, 2015, United States District Court, Northern District of Texas, Dallas Division, 2 pages.
Cinsay, Inc. v. Joyus, Inc., Case No. 3:13-cv-3628-K, "Plaintiff Cinsay, Inc.'s Response to Defendant Joyus, Inc.'s Motion for Judgment on The Pleadings," filed in the United States District Court, Northern District of Texas, Dallas Division, on Feb. 24, 2015, 23 pages.
"Content distributors can shopping-enable video content," www.web.archive.org, Apr. 27, 2007, 1 page.
"DART Motif for In-Stream Helps Publishers Improve Efficiency, Push the Envelope with Video Ad Effects and Offer Advertisers Trusted, Reliable Reporting Metrics," Nov. 6, 2006, 3 pages.
Decision on Grant for Russian Application No. 2012105917, dated Jan. 11, 2016, 6 pages.
Decision to Refuse and Minutes of the Oral Proceeding for European Patent Application No. 10803672.4, dated Feb. 23, 2016, 13 pages.
"Digital Video Ad Serving Template (VAST), Version 2.0," iab., Nov. 2009, 16 pages.

(56) References Cited

OTHER PUBLICATIONS

"Digital Video Ad Serving Template (VAST), Version 2.0," iab., Nov. 2009, 18 pages (Redlined).
"Digital Video In-Stream Ad Format Guidelines and Best Practices," Interactive Advertising Bureau, May 2008, 17 pages.
"DoubleClick Debuts Video Ad-Serving Solution," Nov. 6, 2006, 2 pages.
"ebd Web Video Player, Increase Online Video Ad Monetization," www.ebdsoft.tv, 2010, 2 pages.
Extended European Search Report for European Application No. 10803672.4, mailed Apr. 2, 2013, 4 pages.
Extended European Search Report for European Application No. 12828677.0, mailed Sep. 28, 2015, 7 pages.
Extended European Search Report for European Application No. 16168191.1, mailed Sep. 6, 2016, 9 pages.
"Final Broadband Ad Creative Guidelines," Interactive Advertising Bureau, May 2006, Standards & Guidelines, 4 pages.
First Office Action for Chinese Application No. 201080040436.3, dated Jul. 21, 2015, 32 pages.
First Office Action for Chinese Application No. 201610833301.1, dated Jan. 31, 2019, 32 pages.
Gannes, L., "YouTube's New Inline Ads: Screenshots," May 11, 2007, 7 pages.
Grigoras, E., "Viral marketing—active consumers vs. passive consumers," (Jan. 2009), Retrieved from the Internet: URL: http://papers.ssrn.com/sol3/Delivery.cfm/SSRN_ID1479789_code1346484.pdf?abstra ctid=1479789&mirid=1 [Retrieved on aug. 25, 2016].
Helft, M., "Google Aims to Make YouTube Profitable With Ads," The New York Times, Aug. 22, 2007, 3 pages.
"Shopisodes Enable You to Dress Like Your Favorite TV Character," www.web.archive.org, Oct. 26, 2007, 1 page.
Hrbacek, J. et al., "E-Learning Flash Applications and their Communication with Surrounding," ICETA 2008 International Conference, The High Tatras, Slovakia, Sep. 11-13, 2008, [Online], Retrieved from the Internet: URL: https://www.researchgate.neVprofile/Jiri_Hrbacek/publication/267830194, [Retrieved on Jul. 10, 2018], 6 pages.
"IAB Announces Advertising Creative Guidelines for Online Broadband Video Commercials," Nov. 29, 2005, 4 pages.
International Search Report and Written Opinion for International Application No. PCT/US2010/057567, mailed Jun. 24, 2011, 9 pages.
International Search Report and Written Opinion for International Application No. PCT/US2012/052897, mailed Nov. 14, 2012, 6 pages.
International Search Report and Written Opinion for International Application No. PCT/US2013/047124, mailed Jan. 10, 2014, 6 pages.
International Search Report and Written Opinion for International Application No. PCT/US2014/019979, mailed Jun. 4, 2014, 12 pages.
International Search Report and Written Opinion for International Application No. PCT/US2014/055226, mailed Dec. 16, 2014, 6 pages.
International Search Report and Written Opinion for International Application No. PCT/US2014/055229, mailed Dec. 16, 2014, 6 pages.
International Search Report and Written Opinion for International Application No. PCT/US2014/055233, mailed Nov. 24, 2014, 5 pages.
International Search Report and Written Opinion for International Application No. PCT/US2014/057595, mailed Dec. 15, 2014, 5 pages.
International Search Report and Written Opinion for International Application No. PCT/US2014/057597, mailed Jan. 9, 2015, 6 pages.
International Search Report and Written Opinion for International Application No. PCT/US2014/060150, mailed Jan. 26, 2015, 6 pages.
International Search Report and Written Opinion for International Application No. PCT/US2015/018140, mailed Jun. 3, 2015, 9 pages.
Kaplan, D., "Delivery Agent lets you buy products in your favorite TV shows," www.web.archive.org, May 4, 2007, 4 pages.
Krikke, J., "Streaming Video Transforms the Media Industry," IEEE, Jul./Aug. 2004, p. 6-12.
Liebman, J., "Reality TV That's Social, Bravo!," www.web.archive.org, Dec. 22, 2008, 6 pages.
Mei, T et al., "VideoSense—Towards Effective Online Video Advertising," Sep. 23-28, 2007, p. 1075-1084.
Notice of Allowance for U.S. Appl. No. 13/598,443, mailed May 8, 2014, 8 pages.
Notice of Allowance for U.S. Appl. No. 17/577,164 dated Dec. 13, 2022, 8 pages.
Notification on Results of Estimation of Patentability of Invention for Russian Application No. 2012105917, dated Feb. 16, 2015, 7 pages.
Office Action for Australian Application No. 2012302021, dated Oct. 22, 2015, 3 pages.
Office Action for European Application No. 16168191.1, mailed Jul. 18, 2018, 7 pages.
Office Action for Russian Application No. 2016118232/08, dated Oct. 25, 2019, 4 pages.
Office Action for U.S. Appl. No. 12/363,713, mailed Jun. 13, 2012, 13 pages.
Office Action for U.S. Appl. No. 12/363,713, mailed Oct. 3, 2011, 9 pages.
Office Action for U.S. Appl. No. 12/434,569, mailed Jul. 18, 2013, 9 pages.
Office Action for U.S. Appl. No. 12/434,569, mailed Mar. 15, 2013, 8 pages.
Office Action for U.S. Appl. No. 12/434,569, mailed Mar. 20, 2014, 10 pages.
Office Action for U.S. Appl. No. 12/434,569, mailed May 4, 2012, 6 pages.
Office Action for U.S. Appl. No. 12/434,569, mailed Nov. 19, 2013, 11 pages.
Office Action for U.S. Appl. No. 12/434,569, mailed Oct. 2, 2014, 10 pages.
Office Action for U.S. Appl. No. 12/434,569, mailed Oct. 25, 2012, 9 pages.
Office Action for U.S. Appl. No. 12/787,505, mailed Apr. 13, 2016, 14 pages.
Office Action for U.S. Appl. No. 12/787,505, mailed Apr. 5, 2012, 16 pages.
Office Action for U.S. Appl. No. 12/787,505, mailed Aug. 27, 2014, 12 pages.
Office Action for U.S. Appl. No. 12/787,505, mailed Feb. 10, 2017, 17 pages.
Office Action for U.S. Appl. No. 12/787,505, mailed Jul. 16, 2015, 14 pages.
Office Action for U.S. Appl. No. 12/787,505, mailed Mar. 1, 2013, 10 pages.
Office Action for U.S. Appl. No. 12/787,505, mailed Mar. 18, 2014, 10 pages.
Office Action for U.S. Appl. No. 12/787,505, mailed Nov. 23, 2015, 14 pages.
Office Action for U.S. Appl. No. 12/787,505, mailed Oct. 24, 2012, 9 pages.
Office Action for U.S. Appl. No. 12/787,505, mailed Sep. 23, 2013, 10 pages.
Office Action for U.S. Appl. No. 13/605,892, mailed Jan. 18, 2013, 10 pages.
Office Action for U.S. Appl. No. 13/753,384, mailed Dec. 20, 2013, 10 pages.
Office Action for U.S. Appl. No. 13/753,384, mailed Jul. 9, 2014, 9 pages.
Office Action for U.S. Appl. No. 13/753,384, mailed May 17, 2013, 9 pages.
Office Action for U.S. Appl. No. 13/753,384, mailed Oct. 25, 2013, 14 pages.

(56) References Cited

OTHER PUBLICATIONS

Office Action for U.S. Appl. 13/762,184, mailed Mar. 28, 2013, 8 pages.
Office Action for U.S. Appl. No. 13/923,089, mailed Aug. 20, 2014, 10 pages.
Office Action for U.S. Appl. No. 13/923,089, mailed Dec. 2, 2014, 5 pages.
Office Action for U.S. Appl. No. 14/042,477, mailed Apr. 10, 2014, 9 pages.
Office Action for U.S. Appl. No. 14/079,385, mailed Aug. 27, 2014, 12 pages.
Office Action for U.S. Appl. No. 14/079,385, mailed Feb. 21, 2014, 10 pages.
Office Action for U.S. Appl. No. 14/079,385, mailed Feb. 3, 2016, 14 pages.
Office Action for U.S. Appl. No. 14/079,385, mailed Jul. 1, 2015, 13 pages.
Office Action for U.S. Appl. No. 14/079,385, mailed Mar. 3, 2015, 12 pages.
Office Action for U.S. Appl. No. 14/079,385, mailed Sep. 6, 2016, 14 pages.
Office Action for U.S. Appl. No. 14/091,219, mailed Apr. 11, 2014, 9 pages.
Office Action for U.S. Appl. No. 14/091,219, mailed Jul. 21, 2014, 11 pages.
Office Action for U.S. Appl. No. 14/292,423, mailed Aug. 31, 2017, 18 pages.
Office Action for U.S. Appl. No. 14/292,423, mailed Jan. 9, 2015, 13 pages.
Office Action for U.S. Appl. No. 14/292,423, mailed Jul. 12, 2016, 14 pages.
Office Action for U.S. Appl. No. 14/461,570, mailed Oct. 7, 2015, 8 pages.
Office Action for U.S. Appl. No. 14/484,047, mailed Dec. 18, 2014, 7 pages.
Office Action for U.S. Appl. No. 14/484,047, mailed May 18, 2015, 9 pages.
Office Action for U.S. Appl. No. 14/484,065, mailed Dec. 19, 2014, 7 pages.
Office Action for U.S. Appl. No. 14/484,065, mailed Jul. 17, 2015, 13 pages.
Office Action for U.S. Appl. No. 14/484,225, mailed Dec. 26, 2014, 7 pages.
Office Action for U.S. Appl. No. 14/484,225, mailed May 21, 2015, 12 pages.
Office Action for U.S. Appl. No. 14/497,686, mailed Feb. 24, 2015, 13 pages.
Office Action for U.S. Appl. No. 14/498,800, mailed Mar. 27, 2015, 18 pages.
Office Action for U.S. Appl. No. 14/498,800, mailed Sep. 25, 2015, 20 pages.
Office Action for U.S. Appl. No. 14/512,204, mailed Jan. 6, 2015, 17 pages.
Office Action for U.S. Appl. No. 14/512,204, mailed Jul. 30, 2015, 21 pages.
Office Action for U.S. Appl. No. 14/633,986, mailed Sep. 3, 2015, 16 pages.
Office Action for U.S. Appl. No. 14/800,581, mailed Oct. 15, 2015, 5 pages.
Office Action for U.S. Appl. No. 14/808,768, mailed Nov. 6, 2015, 8 pages.
Office Action for U.S. Appl. No. 14/808,789, mailed Nov. 5, 2015, 6 pages.
Office Action for U.S. Appl. No. 14/808,794, mailed Nov. 4, 2015, 6 pages.
Office Action for U.S. Appl. No. 14/808,831, mailed Nov. 9, 2015, 6 pages.
Office Action for U.S. Appl. No. 14/808,845, mailed Nov. 23, 2015, 6 pages.
Office Action for U.S. Appl. No. 15/063,399, mailed May 27, 2016, 13 pages.
Office Action for U.S. Appl. No. 15/063,405, mailed May 13, 2016, 15 pages.
Office Action for U.S. Appl. No. 15/063,407, mailed May 18, 2016, 20 pages.
Office Action for U.S. Appl. No. 15/063,412, mailed May 19, 2016, 17 pages.
Office Action for U.S. Appl. No. 15/063,415, mailed May 19, 2016, 14 pages.
Office Action for U.S. Appl. No. 15/063,418, mailed May 25, 2016, 17 pages.
Office Action for U.S. Appl. No. 15/983,934, mailed Sep. 14, 2018, 9 pages.
Office Action for U.S. Appl. No. 16/595,149, mailed Apr. 24, 2020, 11 pages.
Office Action for U.S. Appl. No. 16/595,149, mailed Feb. 2, 2021, 13 pages.
Reid, F. et al., "An Analysis of Anonymity in the Bitcoin System," Cha. 1 (online), URL: https://arxiv.org/pdf/1107.4524.pdf, May 7, 2012, 29 pages.
Rich Media Guidelines: Fall 2004, Dec. 31, 2006, 3 pages.
Rick, C., "A comprehensive list of online video ad types and formats, pros and cons," ReelSEO [online], Jun. 17, 2012, [retrieved from the internet on Feb. 24, 2016], 13 pages.
Second Office Action for Chinese Application No. 201080040436.3, dated Feb. 29, 2016, 8 pages.
Skidgel, J., "Producing Flash CS3 Video, Techniques for Video Pros and Web Designers," 2007, 9 pages.
Tomlinson, C., "Google Tries to Relive Past Glories by Making YouTube PPay for Itself," Birmingham Post, Sep. 4, 2007, 3 pages.
Van Vilet, H., "Where Television and Internet Meet . . . New Experiences for Rich Media," E-VIEW 02-1, Jan. 2002, 35 pages.
Vaughan-Nichols, S. J., "Will HTML 5 restandardize the web?", Computer, 43(4):13-15 (Apr. 2010).
Wan, K. et al., "Advertising Insertion in Sports Webcasts", Apr.-Jun. 2007 IEEE, p. 78-82.
"Yellow vertical line in YouTube video timeline," Web Applications Stack Exchange [online], [retrieved from the internet on Nov. 17, 2015], 2 pages.

\* cited by examiner

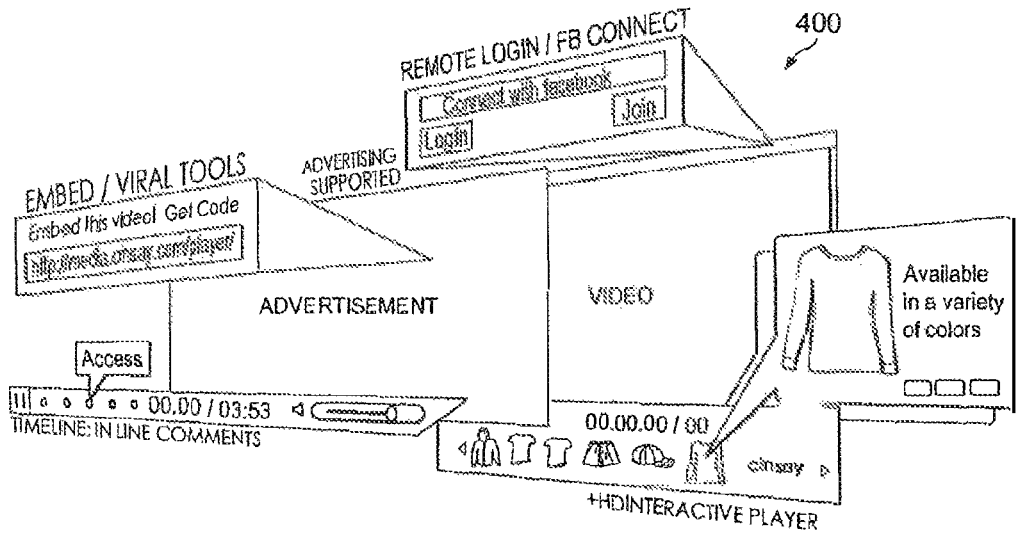

APPLICATION EMBED CODE EXAMPLE
(UTILIZING STANDARD EMBED CODE INTEGRATION INTO REMOTE ONLINE DESTINATIONS)

```
<object classid='clsid:D27CDB6E-AE6D-11cf-96B8-444553540000'
        id='Syndicated Player' width='315' height='448'
        codebase='http://fpdownload.macromedia.com/get/flashplayer/current/swflash.cab'>
    <param name='movie' value='http://www.cinsay.com/player/SyndicatedPlayer.swf?playerId=fs000080000iaj31pel0000000' />
    <param name='quality' value='high' />
    <param name='bgcolor' value='#000000' />
    <param name='wmode' value='transparent' />
    <param name='allowfullscreen' value='true' />
    <param name='allowScriptAccess' value='sameDomain' />
    <embed src='http://www.cinsay.com/player/SyndicatedPlayer.swf?playerId=fs000080000iaj31pel0000000' quality='high' bgcolor='#000000'
        width='100%' height='100%' name='SyndicatedPlayer' align='middle'
        play='true'
        loop='false'
        quality='high'
        wmode='transparent'
        allowScriptAccess='sameDomain'
        allowFullScreen='true'
        type='application/x-shockwave-flash'
        pluginspage='http://www.adobe.com/go/getflashplayer'>
    </embed>
</object>
</noscript>
```

FIG. 3

INTERACTIVE PRODUCT PLACEMENT SYSTEM AND METHOD THEREFOR

CROSS-REFERENCE TO RELATED APPLICATIONS

This application is a continuation of U.S. patent application Ser. No. 17/577,164, filed Jan. 17, 2022, entitled "INTERACTIVE PRODUCT PLACEMENT SYSTEM AND METHOD THEREFOR," (now U.S. Pat. No. 11,669,873), which is a continuation of U.S. patent application Ser. No. 16/595,149, filed Oct. 7, 2019, (now U.S. Pat. No. 11,227,315, issued Jan. 18, 2022), entitled "INTERACTIVE PRODUCT PLACEMENT SYSTEM AND METHOD THEREFOR," which is a continuation of U.S. patent application Ser. No. 16/034,900, filed Jul. 13, 2018, (now U.S. Pat. No. 10,438,249, issued Oct. 8, 2019), entitled "INTERACTIVE PRODUCT PLACEMENT SYSTEM AND METHOD THEREFOR, which is a continuation of U.S. patent application Ser. No. 14/079,385, filed Nov. 13, 2013 (now U.S. Pat. No. 10,055,768, issued Aug. 21, 2018), entitled "INTERACTIVE PRODUCT PLACEMENT SYSTEM AND METHOD THEREFOR," which is a continuation of U.S. patent application Ser. No. 12/787,505, filed May 26, 2010, which is a continuation-in-part of U.S. patent application Ser. No. 12/363,713, filed Jan. 30, 2009 (now U.S. Pat. No. 8,312,486, issued Nov. 13, 2012), which claims priority to and benefit of U.S. Provisional Patent Application No. 61/024,829, filed Jan. 30, 2008; the entirety of each of the aforementioned applications is hereby expressly incorporated by reference, as if fully set forth herein, for all purposes.

TECHNICAL FIELD

The invention relates generally to interactive media content distribution, and, more particularly, to the placement in a viral player of products associated with media content for interactive purchase. The invention relates generally to interactive video broadcasting, and, more particularly, to placement of products in video broadcast for interactive purchase.

BACKGROUND

Using existing technology, e-commerce purchases are typically facilitated on the Internet by directing consumers to purchase products through specified websites. It is well-known that video may be broadcast or provided through a number of media, such as television, the Internet, DVD, and the like. To finance such video broadcast, commercial advertisements are often placed in the video. Commercials, however, require that the video be momentarily interrupted while the commercial is displayed. Not only is that annoying to viewers, but modem technology has developed digital video recorders (DVR's) that allow video programs to be pre-recorded, and when viewed, to fast-forward through commercials, thereby defeating the effectiveness and, hence, value of commercials. When commercials are de-valued, costs are not adequately covered, and as a result, broadcast service quality suffers. In many cases, costs are made up by charging viewers for the video service. Therefore, what is needed is a system and method for advertising commercial products in such a way that they are not annoying and do not interrupt a video production, prompting a user fast-forward through them.

SUMMARY

With existing technology, a consumer on the Internet may be directed to a specific website via online advertising or sponsored links, where such websites describe specific products available for purchase, allow the consumer to choose a product for purchase, and direct the consumer to purchase the product through an e-commerce application from that website. Thus, one drawback with existing technology is that it requires the consumer to navigate to a specific website to purchase a product, which can be time-consuming and discourage product purchases.

Furthermore, using existing technology, products advertised on the Internet are traditionally advertised through banner advertising, "clickable" ads, sponsored links, or the like. Such advertising can range from static graphical images to rich media content, permitting the user to "click" on the ad and be redirected to a new web page (either in a new browser window or a new tab in the user's browser) to display the product, describe the product, and provide a mechanism to facilitate the purchase through an e-commerce application through that website. If a user is watching and/or listening to media content when the purchase is desired, then it can be very distracting to have to navigate to another web page to purchase the product and, when attempting to return to the media content, the user may potentially lose the media content or lose the place in the media content requiring that the media content be restarted, frustrating a user and discouraging future purchases, and further resulting in lost revenues and business.

Still further, with existing technology, most product marketing on the Internet is achieved through banner advertising, "click-through" ads, or similar commercials run on a media player on a specific website. Although such ads can be placed on different websites through contractual arrangements with web site owners and ad server networks, such ads are limited to specific areas designated for advertising on such websites, thereby limiting the scope of advertising to users who visit such specific websites, and further limiting such scope to the specific number of ad rolls associated with the traffic to such website or imposing other ad servicing provider limitations on the number of times such advertising for the product is presented on such websites, thereby restricting a user's opportunity to purchase the advertised product.

Therefore, what is needed is a system and method for facilitating e-commerce transactions without requiring that a consumer navigate to another website to engage in a transaction for the purchase of a product, without excessively distracting a consumer when watching and/or listening to media content, without limiting the marketing of a product through ads in specific areas designated for advertising on specific websites, without limiting the scope of advertising to users who visit such specific websites, and without limiting the marketing of a product to a specific number of ad rolls or other ad servicing provider limitations on the number of times advertising for products is presented on such websites.

The present invention, accordingly, permits a consumer to view a product in conjunction with a viral player, and to select the product for purchase within the player, rather than be redirected to a separate website. There is thus no longer a need to go to a specific website to purchase a product; the viral player acts as the vehicle to facilitate the "front-end" of the purchase.

Furthermore, products can be displayed in connection with specified content at the player level—the present invention brings the e-commerce "store" directly to the user, rather than directing the user to a specified website. Specifically, the player can run media content within the player frame, with associated products listed in a separate area of the player that the user can "click" on to facilitate the purchase through the e-commerce platform back-end. Essentially, the user is able to view and purchase a product within the player while watching or listening to media content, thereby bringing the ability to facilitate the sale of a product as part of the rich media experience.

Still further, products may be marketed "virally", permitting content owners to monetize content. In accordance with the present invention, the syndicated e-commerce player is designed to be embeddable so that users can place it in emails to friends, on social networking sites (e.g. FACEBOOK, MYSPACE, GOOGLE BUZZ, YELP, etc.), or other websites, thereby permitting the syndicated e-commerce player to be distributed virally on the Internet. As a result, the products that are listed in the syndicated e-commerce player can be marketed virally without such restrictions, directly to potential consumers who will be able to view or listen to the media content of the syndicated e-commerce player and immediately purchase the associated product(s) from within the syndicated e-commerce player without being redirected from the media experience.

In one embodiment, the present invention achieves the aforementioned features in a method for facilitating the purchase of commercial products in connection with the display of media content, whereby a player comprises a media production component and an interactive e-commerce component embedded therein. The player with the ecommerce component can be virally copied and propagated from one web page to any number of other web pages.

In another embodiment, a player frame is generated in a first web page. At least a first portion of the player frame is reserved for said media content, and at least a second portion of the player frame is reserved for an interactive e-commerce component. Code is embedded in the player frame for retrieving the media content and placing the media content in the first portion of said player, and code is embedded in the player frame for retrieving the interactive e-commerce component and placing the interactive e-commerce component in the second portion of the player. The player frame may then be virally copied and propagated from one web page to any number of other web pages. A system for implementing the sale of a product in connection with the display of media content includes an enterprise nucleus, and one or more syndicated e-commerce applications coupled in data communication to the enterprise nucleus. The one or more syndicated e-commerce applications include an input terminal for facilitating entry of data by a user and an output terminal for communicating data to a user. An e-commerce platform is coupled in data communication to the enterprise nucleus for facilitating the purchase of products. The system can include at least one content distribution network (CDN) and at least one advertising network, both of which are coupled in data communication to the enterprise nucleus.

The enterprise nucleus of the system further preferably includes a computer having at least a processor and a memory operably coupled to the processor, the memory being configured for storing a computer program executable by the processor, the computer program being configured for performing steps of receiving from one of said one or more e-commerce applications a request for at least one of media, products, and offers, and for transmitting said request to at least one of said CDN and said advertising network; receiving from said at least one of said CDN and said advertising network said at least one of media, products, and offers and for transmitting said at least one of media, products, and offers to said one of said one or more ecommerce applications; receiving from said one of said one or more e-commerce applications a registration ID and a purchase order, and for transmitting said registration ID and a purchase order to said e-commerce platform; and for receiving from said e-commerce platform transaction data relating to said registration ID and a purchase order, and for transmitting said transaction data to said one of said one or more e-commerce applications.

The present invention, accordingly, provides a method for presenting advertisements for commercial products in video productions, whereby the commercial product is placed in the video production as an element of the video production. A viewer is enabled to interact with the video production to select the product. Information is displayed about the selected product; and the viewer is enabled to purchase the selected product.

More specifically, the invention comprises a web-based rich media software application allowing non-technical end-users the ability to easily create full frame interactive media overlays into the video production which has been encoded with pre-defined cue points that request immersive full motion video interactive overlay elements from an ad-server.

The cue points are utilized to trigger pre-defined advertising events stored and indexed with metadata in an ad server or other database. By way of example, an advertising event may include the extraction of a single video frame or a series of frames of the encoded video production, which in turn becomes the interactive advertisement that is triggered by the pre-set cue point and presented to the user as a seamless advertising/entertainment experience.

Once the cue point triggers an event, the system calls the specific advertisement into the video player and seamlessly overlays the initial video production with the enhanced interactive product ads. The ad is displayed for a predetermined life cycle, such as 5-10 seconds. Once the life cycle of the ad expires, or the ad is clicked or presented to the end user, the advertisement will destroy itself, leaving the viewer with the impression that there was never a break in the viewing experience.

In conjunction with the integrated overlay advertisements, the process of the invention is supplemented with an information and product integrated timeline residing under the video production. At the triggered cue point, watermarked icons/logos appear under the video production. Users can interact with the icons to gamer more information about a particular character, location, or advertisers at a specific point in the feature presentation, employing the same aforementioned calls.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 and FIG. 3 exemplify an interface application wireframe utilizing standard embed code for calling into remote online destinations;

DETAILED DESCRIPTION

In the following discussion, numerous specific details are set forth to provide a thorough understanding of the present invention. However, it will be apparent to those skilled in the art that the present invention may be practiced without such specific details. In other instances, elements have been illustrated in schematic or block diagram form in order not to obscure the present invention in unnecessary detail. Additionally, for the most part, details concerning the Internet, HTML (including HTML5), HTTP, HTTPS, SWF, XML, PHP, ADOBE FLASH, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
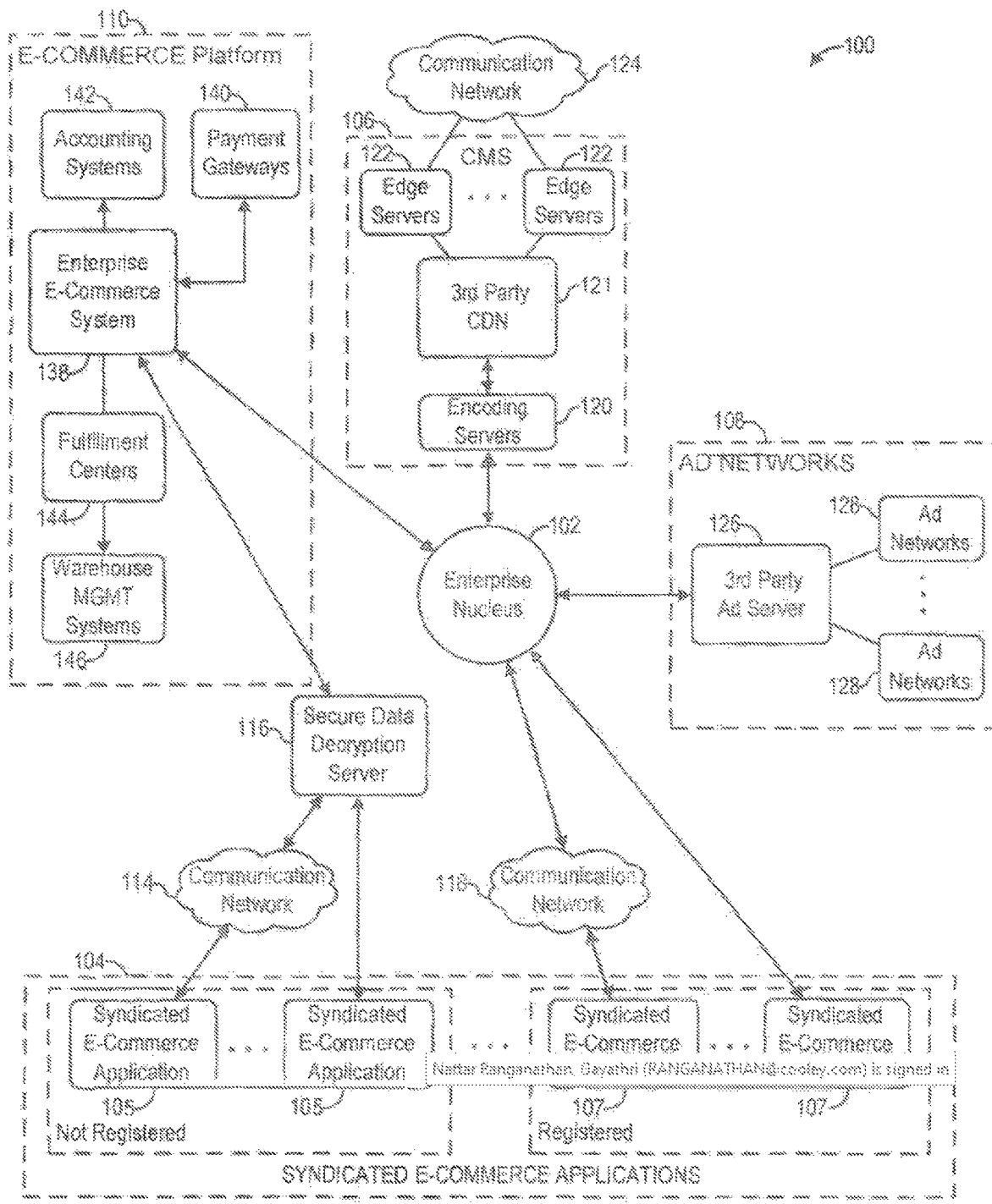
FIG. 1 is a high level block diagram exemplifying data flow in an interactive product placement system embodying features of the present invention.

Referring to FIG. 1 of the drawings, the reference numeral 100 generally designates an interactive content distribution system embodying features of the present invention. The system 100 includes an enterprise nucleus 102 configured as a hub for controlling all operations of the systems 100, discussed in further detail below. Coupled to the enterprise nucleus 102 are one or more syndicated e-commerce applications 104, a content management system ("CMS") 106, advertising networks 108, and an e-commerce platform 110.

The syndicated e-commerce applications 104 coupled to the enterprise nucleus 102 include e-commerce applications 105 in which the end-users are not registered with the e-commerce platform 110 and e-commerce applications 107 in which the end-users are registered with the e-commerce platform 110. The syndicated e-commerce applications 105 and 107 include, by way of example but not limitation, mobile device applications for mobile devices (e.g., IPHONE, smartphones running the Android operating system, portable gaming platforms such as NINTENDO DS), social media applications (e.g., FACEBOOK, MYSPACE, GOOGLE BUZZ), syndicated media player applications, syndicated store applications, applications written for game consoles (e.g., X-BOX, PLAYSTATION, NINTENDO, WII), Internet protocol television ("IPTV"), and any device and/or platform that would allow insertion of syndicated e-commerce applications and conduct the syndicated e-commerce process discussed below. Each of the unregistered e-commerce applications 105 are preferably coupled, either directly (e.g., cable, satellite, fiber optic) or via a communication network (e.g., the Internet, VPN, cellular communications network) 114, to a secure data decryption server ("SDDS") 116, which SDDS is in turn coupled to the e-commerce platform 110, described in further detail below. Each of the registered e-commerce applications 107 are preferably coupled, either directly or via a communication network (e.g., the Internet, cellular communications network) 116, to the enterprise nucleus 102.

The CMS 106 includes an encoding server 120 coupled to the enterprise nucleus 102 and to a third party content distribution network ("CDN") 121. The CDN 121 is preferably coupled to one or more edge servers 122, such as provided by Akamai, which provide an interface, via a communication network (e.g., the Internet) 124, between the CDN 124 and one or more content providers (not shown). Content provided by the CMS 106 includes, by way of example but not limitation, motion pictures, motion picture trailers, video, and audio.

The advertisement ("ad") networks 108 include a third-party advertisement server 126 (e.g., Ad-Tech) coupled to the enterprise nucleus 102, and one or more ad networks 128 (e.g., ADMOB, TREMOR MEDIA, and LC?). The ad networks 108 provide, by way of example but not limitation, products lists showing which products are associated or correlated with at least one item associated with or displayed in certain media, and other product information, such as pricing, availability, and the like.

The e-commerce platform 110 includes an enterprise e-commerce system 138 coupled to the enterprise nucleus 102. One or more payment gateways 140 (e.g., PAYPAL), accounting systems 142, and fulfillment centers 144 are coupled to the enterprise e-commerce system 138. One or more warehouse management systems 146 are connected to each fulfillment center 144. The enterprise e-commerce system 138 is further preferably coupled to the SDDS 116 for receiving registration application data from the e-commerce application 105.

Figure 2:
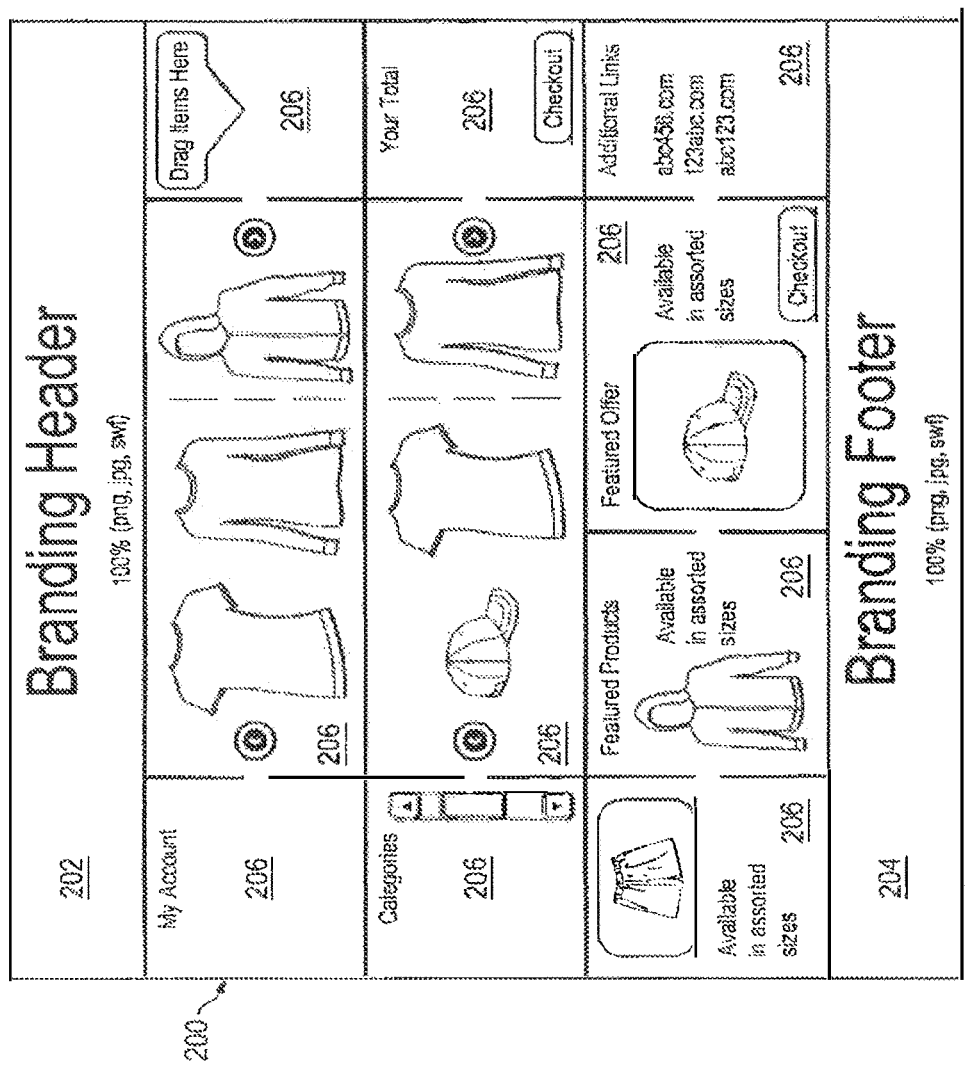

FIG. 2 exemplifies a player frame 200 embodying features of the invention. The frame 200 preferably includes a header 202 and footer 204, as well as a number of sub-frames 206 sandwiched between the header and footer. The sub-frames 206 may be configured for displaying account information, categories, products, featured products, featured offer, a shopping cart, total charges, and additional links (e.g., About Us, Shipping, Returns, Privacy & Security, Conditions of Use, Contact Info, Gift Voucher FAQ).

FIG. 3 exemplifies an alternate embodiment of player frame with video content, advertisements, and an e-commerce component overlaid on the player frame, along with viral tools.

Figure 4:
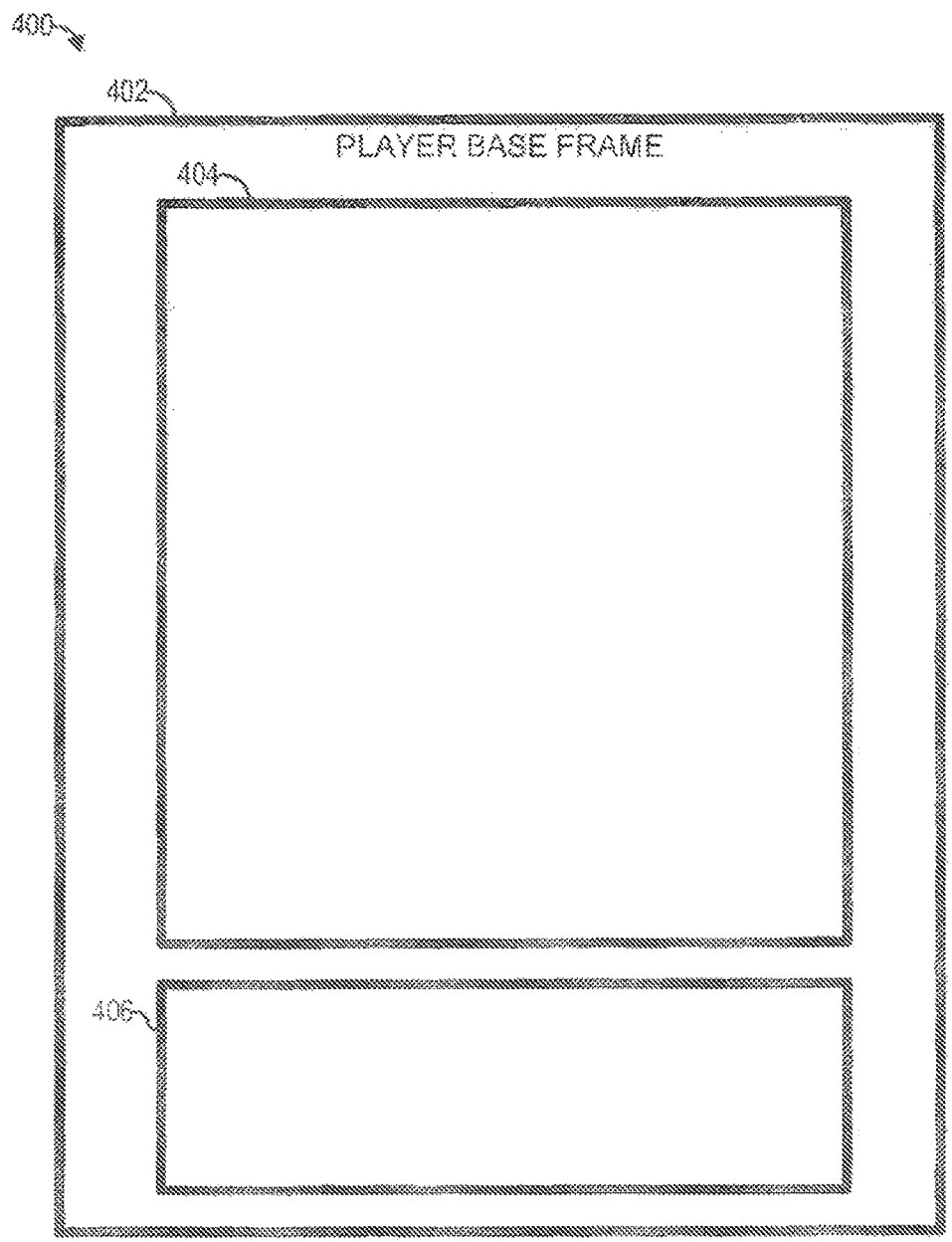
FIG. 4 exemplifies a syndicated e-commerce interface application wireframe utilizing standard embed code into remote online destinations.

FIG. 4 exemplifies a player base frame 400 having an main frame 402, subframe 404 configured for a video production (not part of the base frame), and a subframe 406 configured for an e-commerce application (not part of the base frame). The player base frame 400 also includes embed code (not shown), such as HTML code, for retrieving media content from the CMS 106, ad content and a product list from the ad networks 108, and an e-commerce component of the player from the enterprise nucleus 102, as discussed in further detail below.

The player base frame 400, with the embed code for retrieving media content, ad content, and an e-commerce component, may be virally copied and propagated from one web page to any number of other web pages on the Internet.

Figure 5:
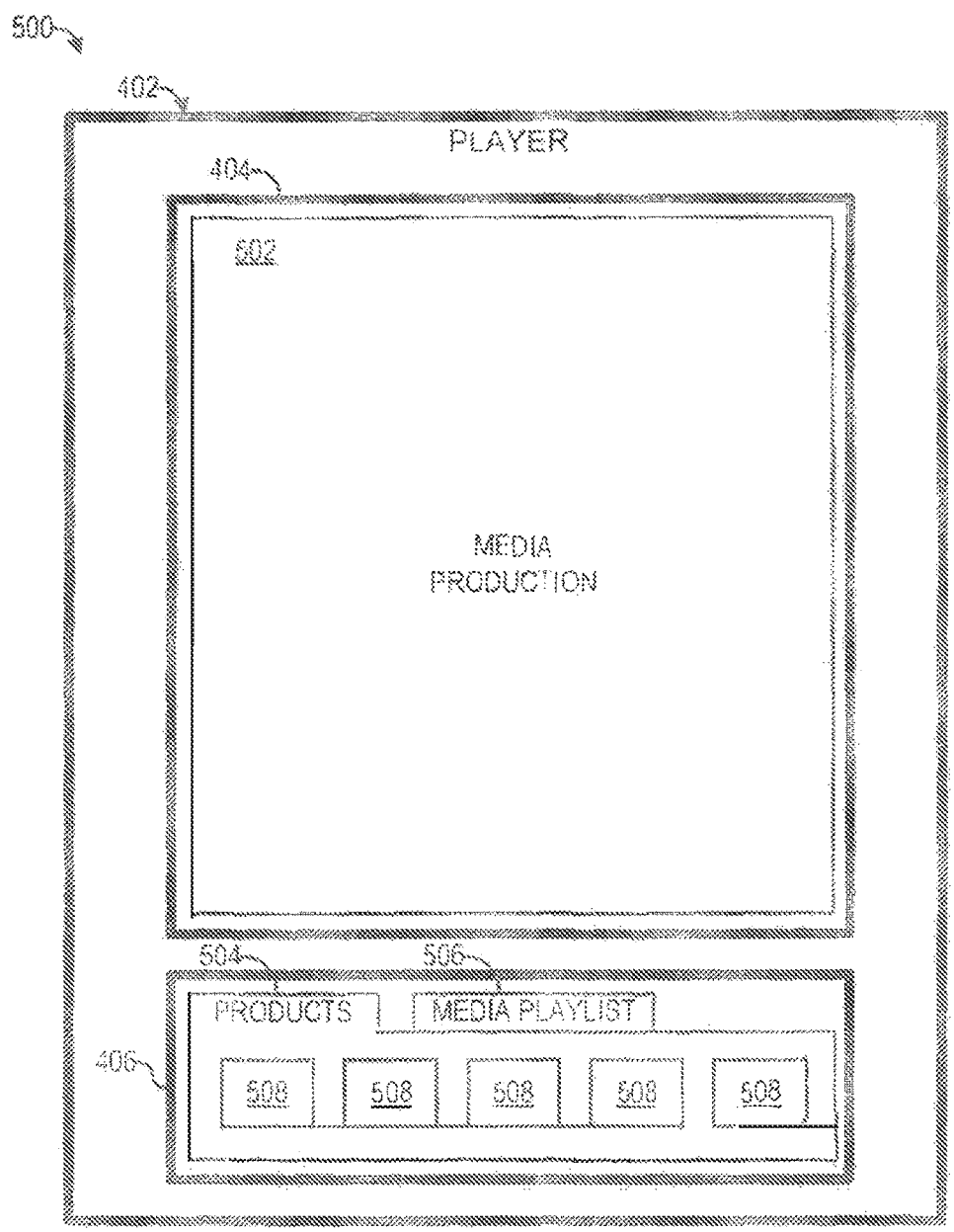
FIG. 5 and FIG. 6 exemplify an implementation embodiment of a syndicated e-commerce interface application wireframe for implementing features of the invention.
Figure 6:
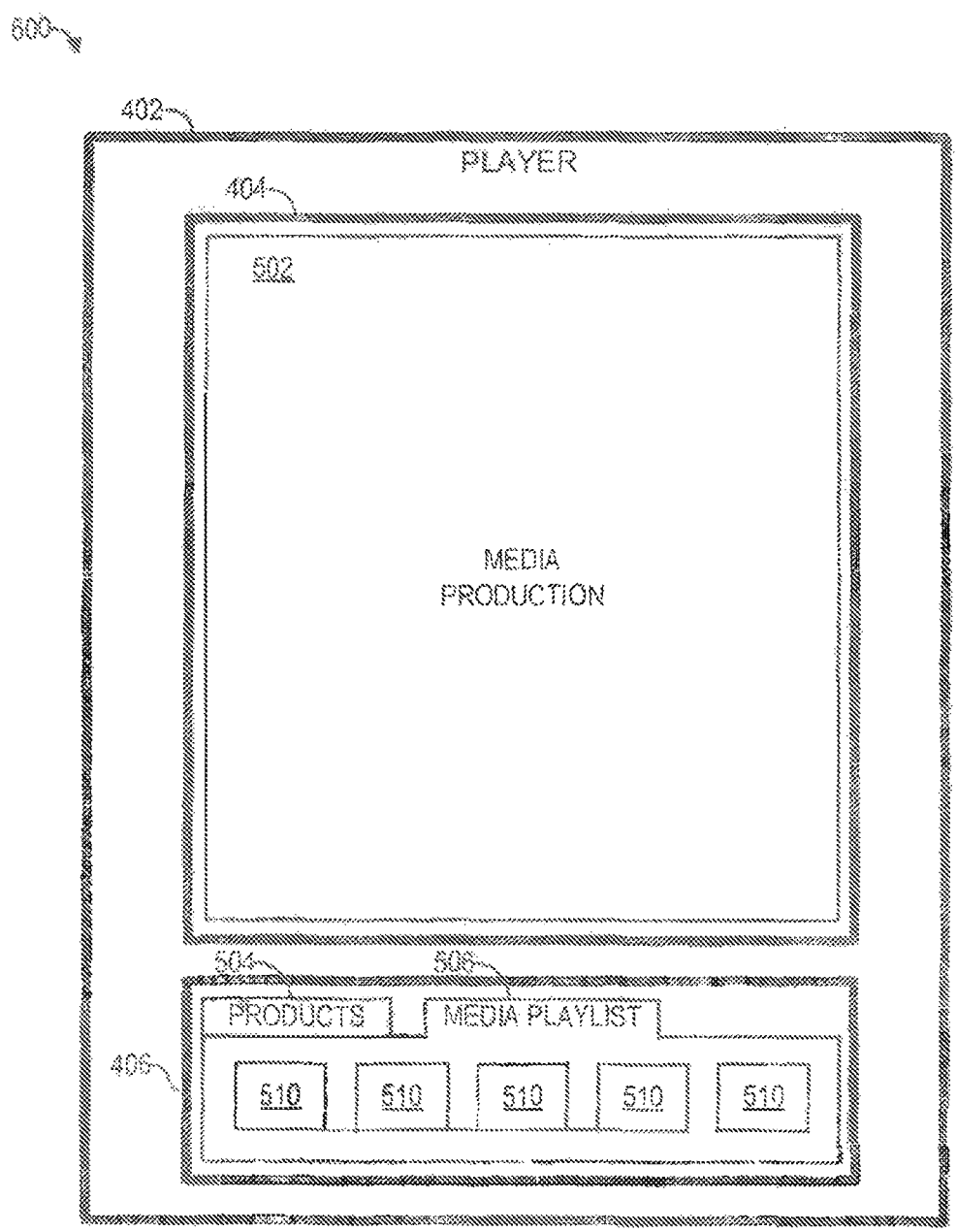

FIG. 5 and FIG. 6 exemplify a player 500 built on the player base frame of FIG. 4. as it would be displayed, for example, on a computer monitor (not shown). The player 500 preferably includes media content (e.g., video, motion picture, audio) 502 presented within the subframe 404 (using, e.g., FLASH encoding) and a syndicated e-commerce component in the subframe 504. The e-commerce component is configured to be an interface between a user and the e-commerce platform 110 and the SDDS 116 (discussed below with respect to steps 714-738 of FIG. 7), and is preferably built on custom encoding, and preferably includes a product list 504 (FIG. 5) and a media play list 506 (FIG. 6) integrated therein for use by a user. The product list 504 preferably displays products 508 that correspond to products being used in the media production 502, which products which may be selected for purchase through the interactive ecommerce component in the subframe 504. The media play list 506 preferably displays a number of media from which a user may select to view or listen to in the media production 502.

Figure 7:
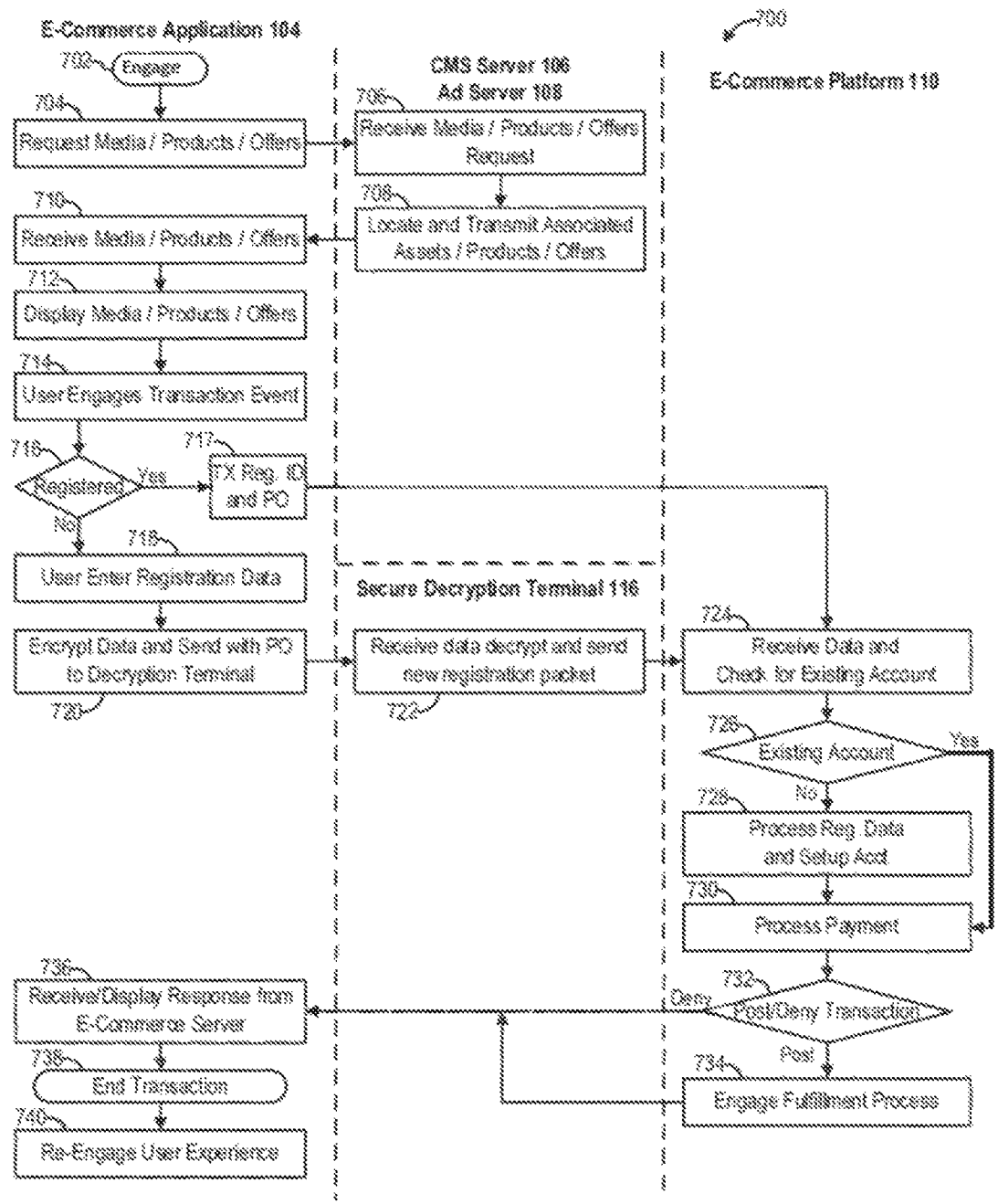
FIG. 7 is a flow chart exemplifying logic utilized in the invention.

FIG. 7 depicts a flow chart 700 exemplifying one preferred embodiment for using the invention. In step 702, a user engages an e-commerce application 104, and in step 704, a user requests (e.g., via the media play list 506) media content (e.g., video, audio, game) with which to be presented. The e-commerce application 104 then generates a request for same along with associated products and product offers, and transmits the request to the enterprise nucleus 102 which forwards same to the CMS server 106 and ad server 108. In step 706, the CMS server 106 retrieves the requested media content and the ad server 108 retrieves ad content (i.e., products and product offers) associated with the media content. In step 708, the requested media content along with associated ad content is transmitted to the e-commerce application 104, and in step 710, same is received by the e-commerce application. In step 712, the media content is presented for display to the user via the media production window 502, and associated ad content is presented in the sub-frame 406.

While viewing the media content, if a user/viewer should see an item or product that the user/viewer would find desirable to have, then in step 714, the user/viewer may engage the e-commerce component 504 to place an order for the product. In step 716, a determination is made whether the user is registered with the e-commerce platform to order the product. If it is determined at step 716 that the user is registered, then execution proceeds to step 717 in which the e-commerce application 104 generates a message comprising the user's registration data and purchase order and forwards same to the e-commerce platform 110. If it is determined at step 716 that the user is not registered, then execution proceeds to step 718 in which the user is prompted to provide information to become registered to purchase the product. In step 720, the user's registration application data is encrypted and transmitted to a secure data decryption server (SDDS), and in step 722, the encrypted data is decrypted and forwarded to the e-commerce platform 110.

At step 724, the e-commerce platform receives the registration data and checks to determine whether the user has an existing account. In step 726, if the user has an existing account, then execution proceeds to step 730; otherwise, execution proceeds to step 728. At step 728, the registration application data is processed and an account is setup in the name of the user, and execution proceeds to step 730. At step 730, payment for the product to be purchased is processed, and at step 732, a determination is made whether to post or deny the transaction. If the transaction is denied, a report of same is transmitted to the e-commerce application 104. If the transaction is posted, then in step 734 the fulfillment center 144 in conjunction with the warehouse management system 146 is instructed to fill the order and a report of same is transmitted to the e-commerce application 104.

In step 736, the e-commerce application 104 receives the report that the transaction was either denied or posted and presents same to the user, and the transaction is terminated at step 738. At step 740, the user resumes viewing or listening to the media content.

Figure 8:
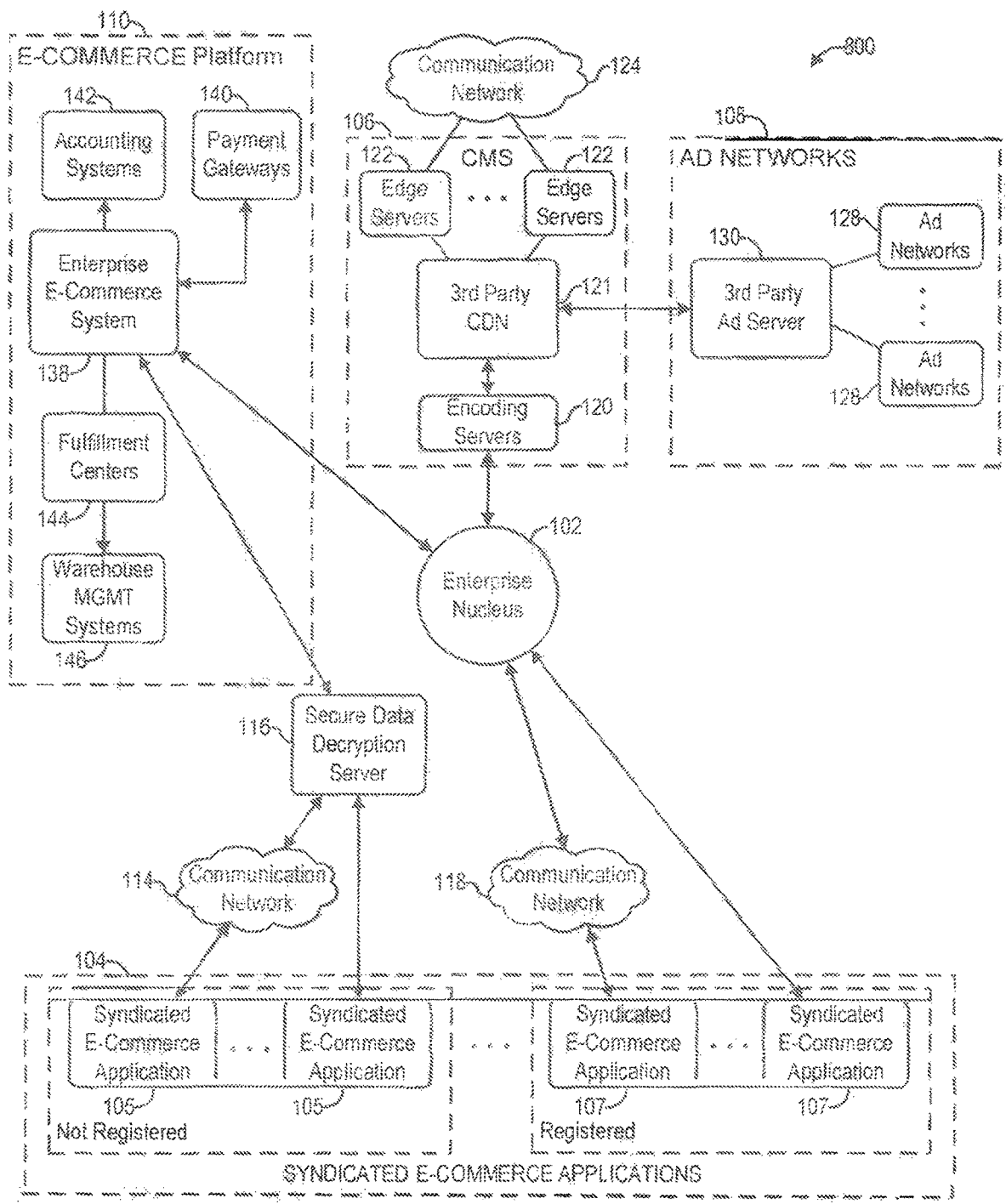
FIGS. 8-10 exemplify alternate embodiments of the system of FIG. 1.
Figure 9:
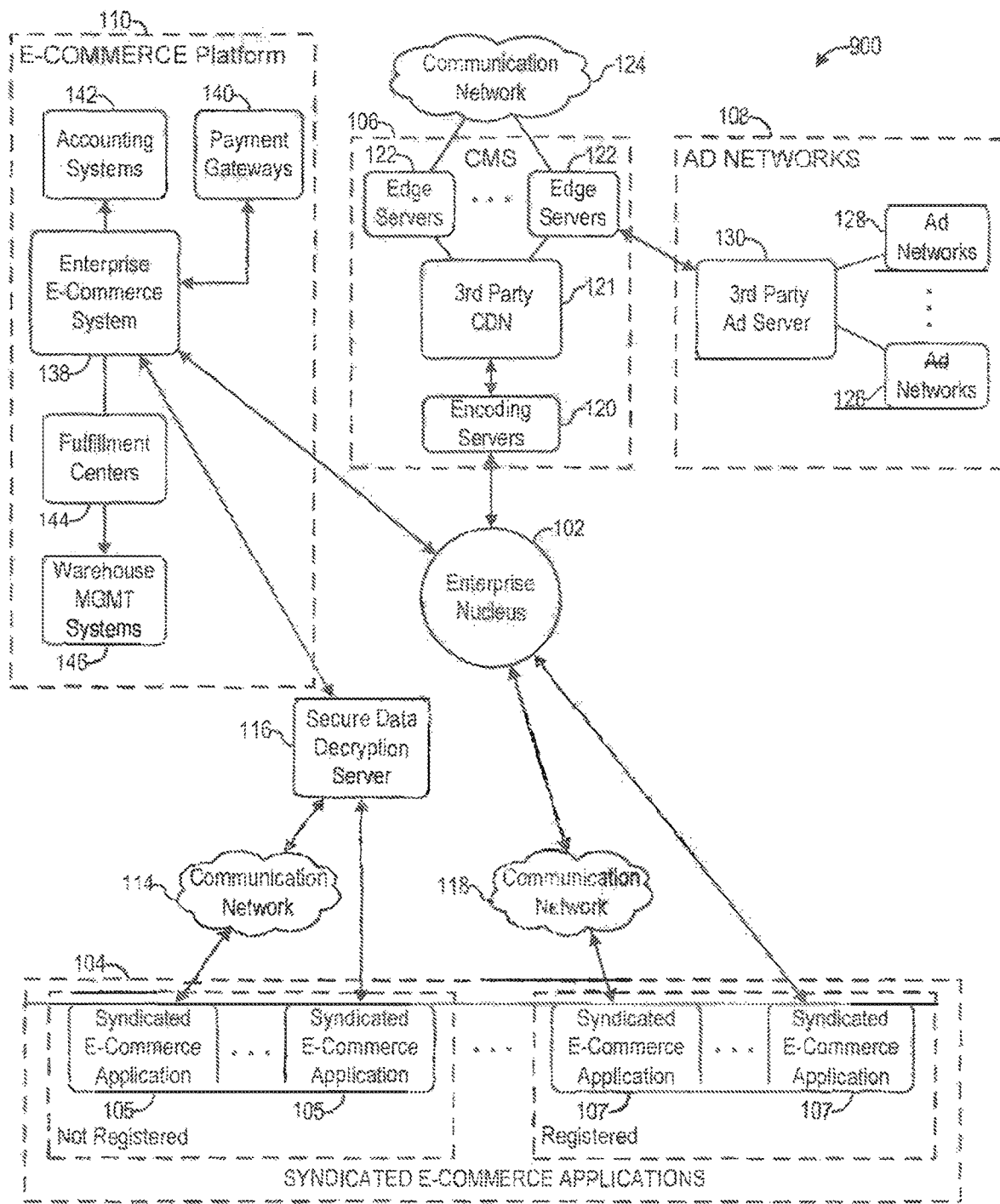
Figure 10:
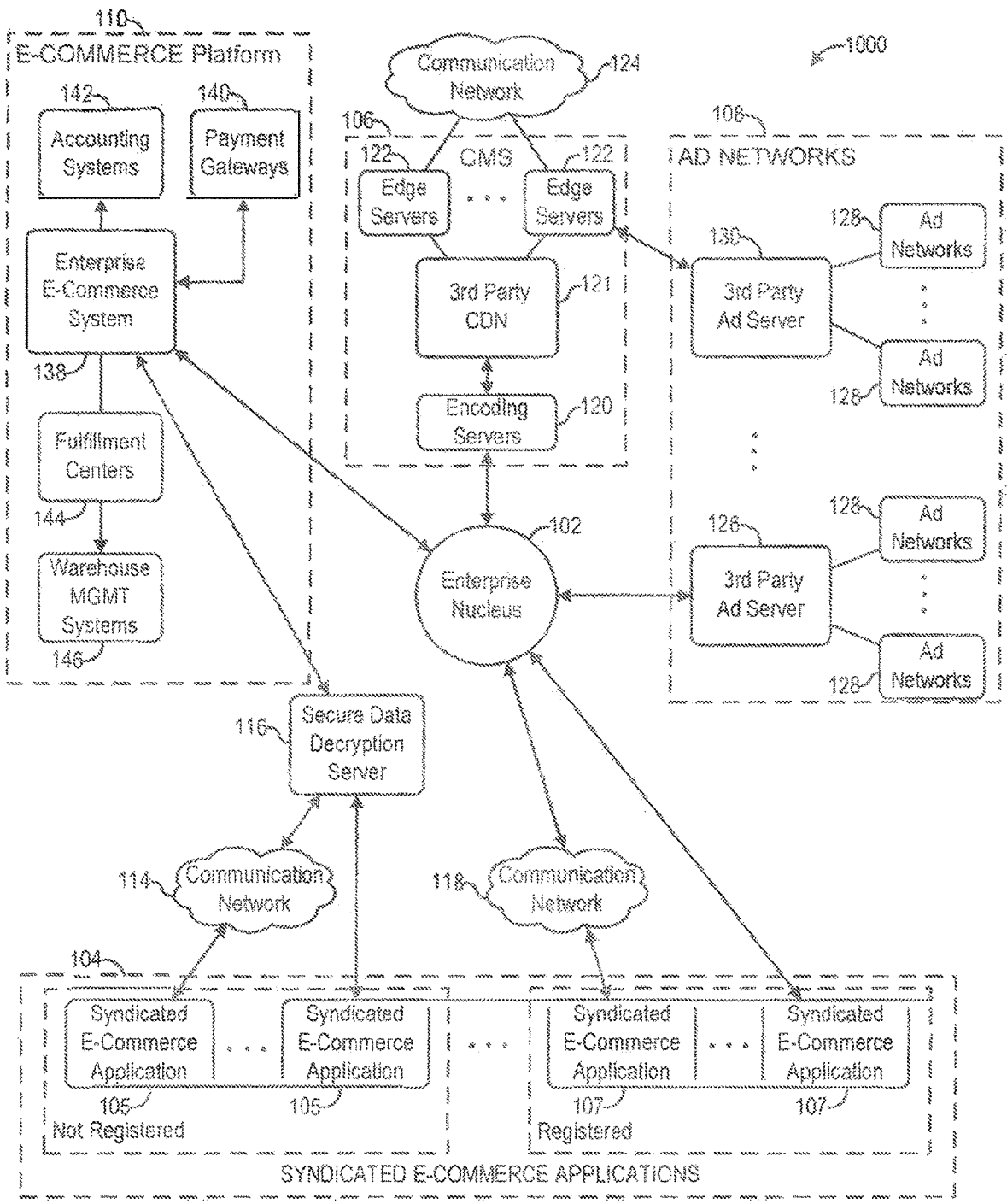

It is understood that the present invention may take many forms and embodiments. Accordingly, several variations may be made in the foregoing without departing from the spirit or the scope of the invention. For example, FIG. 8 shows a system 800 in which the third party ad server 130 may be coupled directly to the third party CDN; FIG. 9 shows a system 900 in which the third party ad server 130 may be coupled directly to the CMS edge servers 122; and FIG. 10 shows a system 1000 in which the third party ad server 130 may be coupled in any combination of ways depicted by FIGS. 1, 8, and 9, and in particular, directly to the enterprise nucleus 102 and CMS edge servers 122.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, HTTP, XML, PHP, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 11:
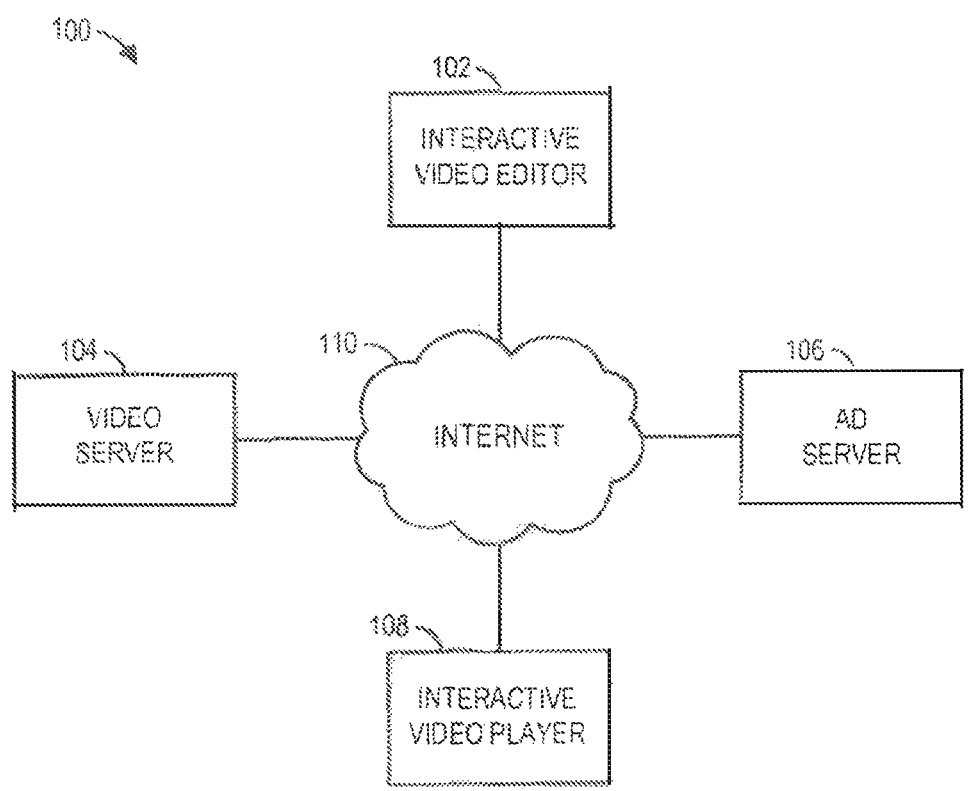
FIG. 11 is a high level block diagram of an interactive product placement system embodying features of the present invention.

Referring to FIG. 11 of the drawings, the reference numeral 100 generally designates an interactive product placement system embodying features of the present invention.

The system 100 includes a video server 104 and an ad (i.e., "advertisement") server 106 coupled together via a communication information network effective for video streaming, such as the Internet, 110. An interactive video editor 102 is coupled via the Internet 110 to the video server 104 and ad server 106 for creating immersive interactive advertisements in conjunction with video productions displayed by the video server. An interactive video player 108 is coupled via the Internet 110 to the video server 104 and ad server 106 for displaying video productions from the video server 104 and ads from the ad server 106 in accordance with principles of the present invention.

Figure 13:
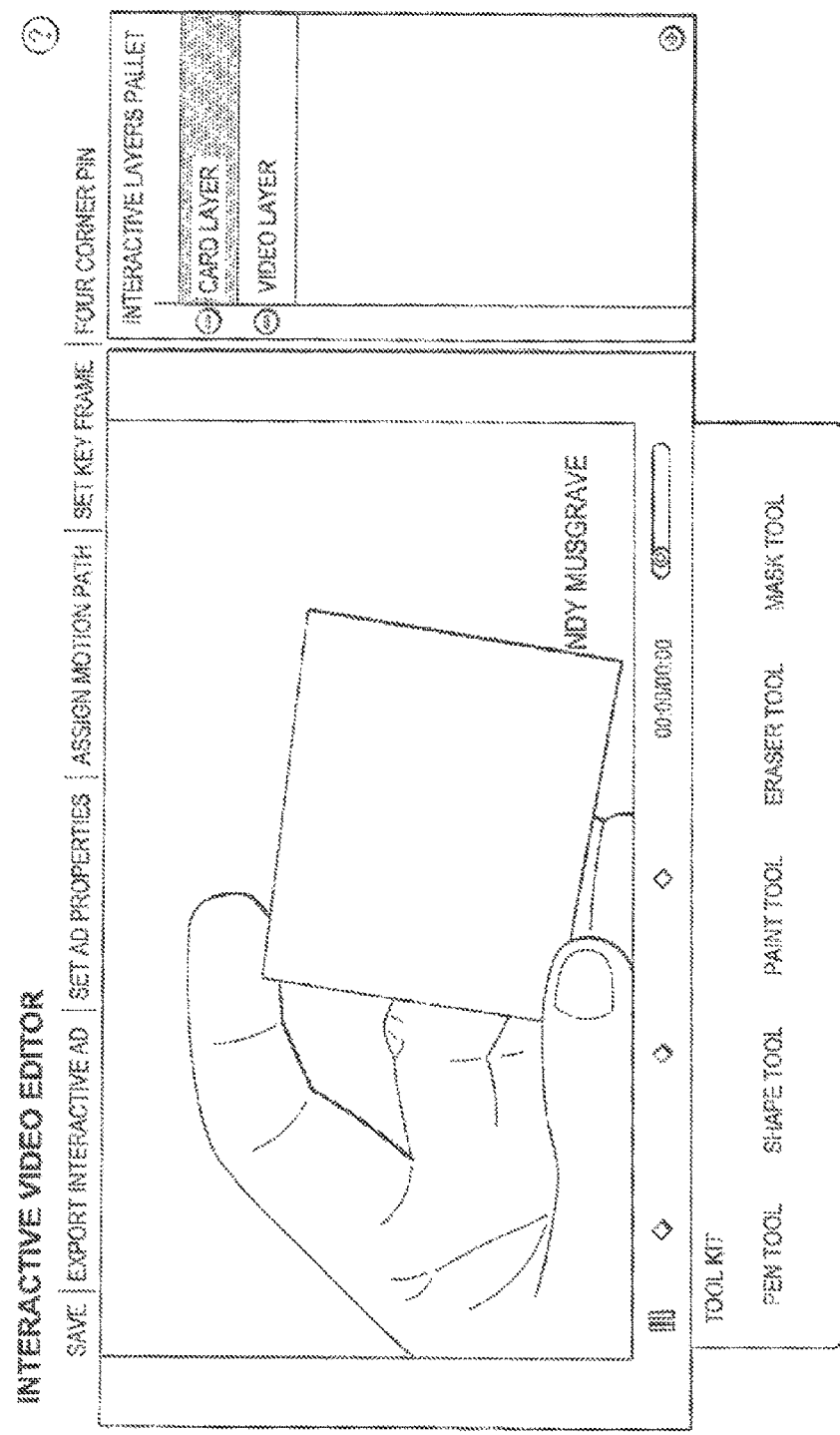
FIG. 13 exemplifies an application of an interactive video editor embodying features of the present invention.

FIG. 13 exemplifies an application of the interactive video editor 102 for enabling non-technical ad representatives to create an immersive interactive advertising experience for users. The editor 102 defines the properties, interactive elements, visuals, and motion of the ad element stored in metadata and XML, format and packaged with the ad file. The editor 102 is a rich media application comprising tools, a user interface, and backend connections to the ad server 106. The following lists, by way of example and not limitation, some preferred features of the editor 102:

File: Open
Save: Save an iteration of video project file.
Export: Export in all applicable compiled final production ready formats.
Properties: Set campaign name, lifespan and essential metadata ad formats.
Assign Path: Create guideline to animate overlay object end to end over.
Set Key: Assign animation key frame.
Four Corner Pin: Pin vector points to set start and end frames over underlying video production. Corner Pin effect distorts an image by repositioning each of its four corners. Use it to stretch, shrink, skew, or twist an image or to simulate perspective or movement that pivots from the edge of a layer The interactive video editor 102 also enables layers to be added to the video production. More specifically, an overlay element allows users to see an underlying video preview. The first layer on the bottom forms a base layer, and anything layered on top of that at least partially obscures the layers underneath it.

Still further, the interactive video editor 102 includes a tool kit, comprising the following:

Pen: freeform drawing tool used to define shape
Shape: Set of predefined shapes to use as interactive element
Paint: Brush tool allowing more freeform element creation
Erase: Remove excess erase tool allows you to remove portions of shapes or lines with precision. You can change the size and shape of the eraser as well as the portions of any shape you want to erase by adjusting the options FIG. 14 exemplifies an application of the interactive video player 108 configured with the capabilities to read, display, and interact with code supplied by the corresponding application of the interactive video editor 102. The player 108 is a rich media application comprising tools, a user interface, and backend connections to the ad server 106.

Figure 14:
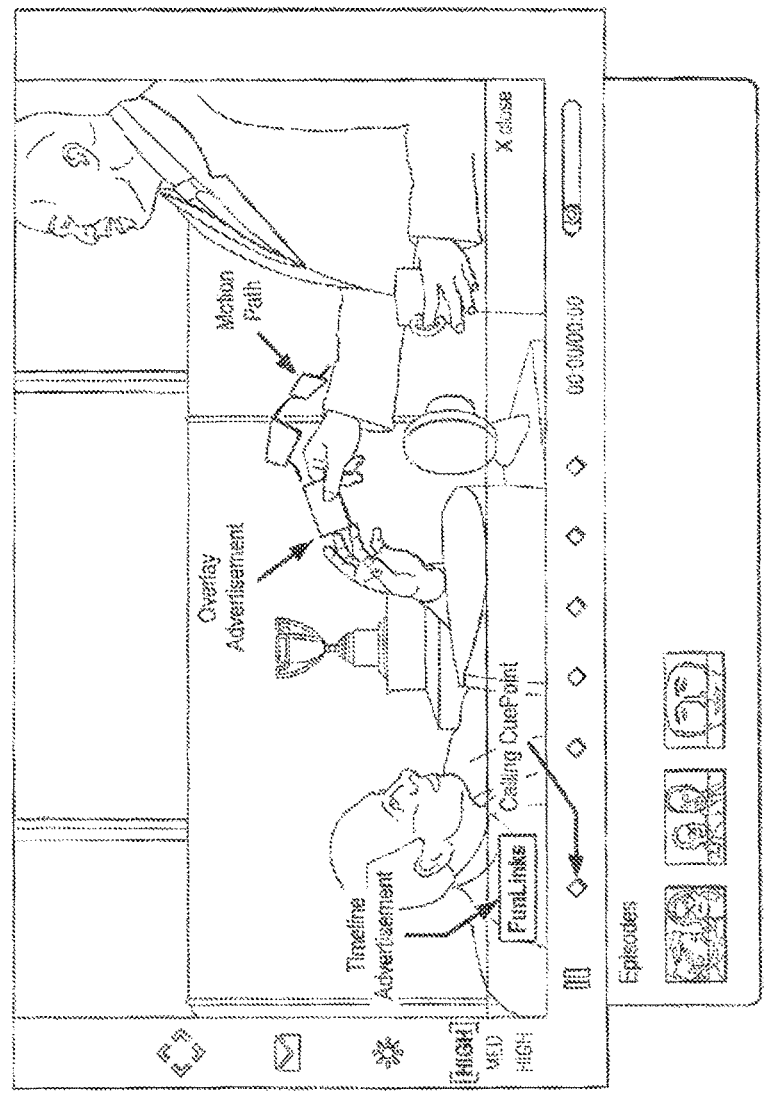
FIG. 14 exemplifies an application of an interactive video player embodying features of the present invention.

As shown in FIG. 14, the video player 108 advertises a card in an overlay as it moves along a motion path. Also shown are an ad icon/logo for the card in a Timeline under the video display, and under the ad icon/logo, a calling cue point corresponding to a respective icon/logo above it. Optionally, under the calling cue points are episodes of the video production being watched. While the timeline is shown positioned beneath the video production, it may be positioned along the top, left, or right margins of the video production.

Figure 12:
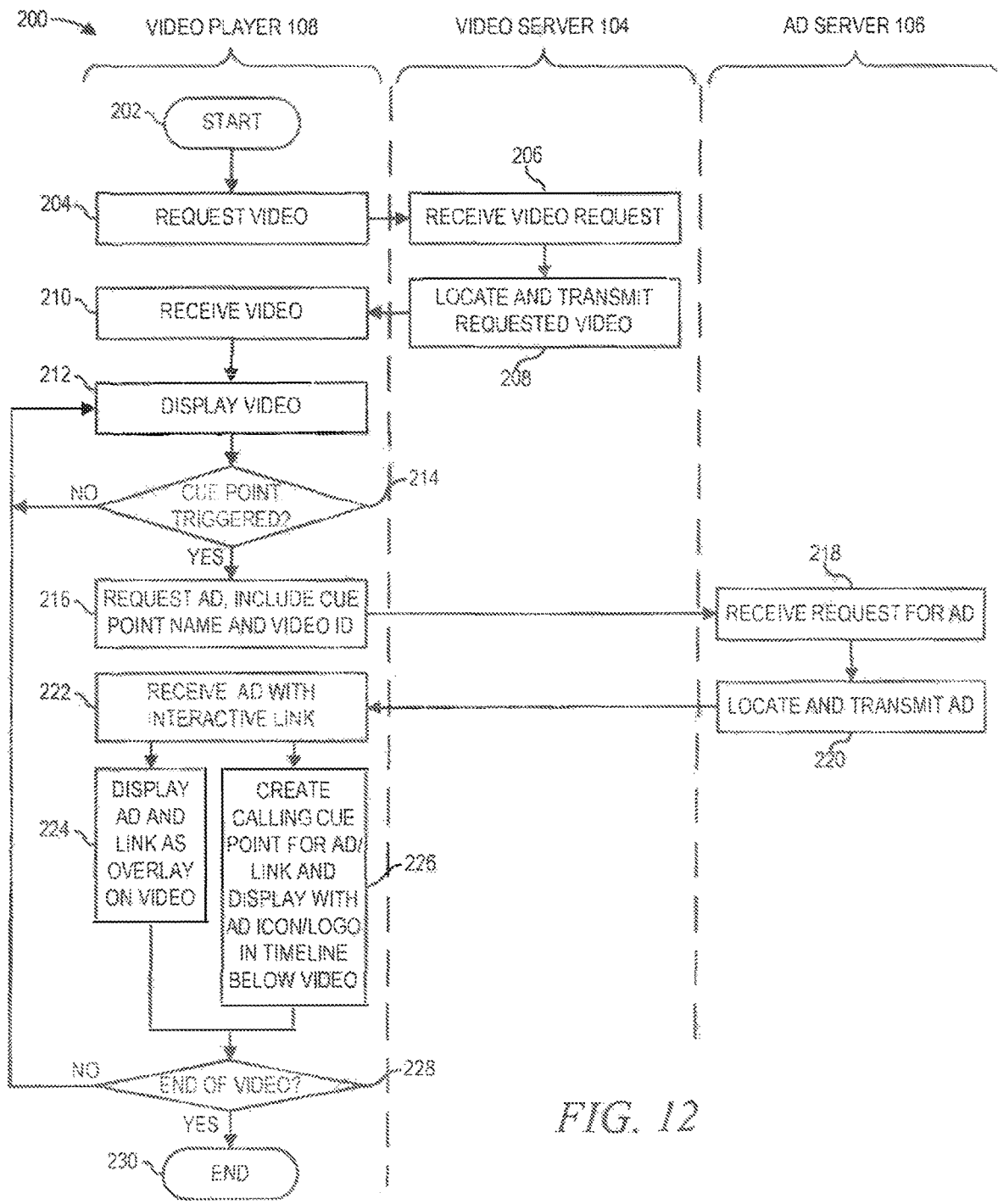
FIG. 12 exemplifies a flow chart illustrating control logic for implementing features of the system of FIG. 11.

FIG. 12 is a flow chart exemplifying steps in the operation of the invention. In step 202 operation begins, and in step 204 a request is generated by the video player 108 (per input from a user) for a video production and transmitted to the video server 104. In step 206, the video server 104 receives the request for a video production and, in step 208, the video server 104 locates the video production and transmits it to the video player 108. In step 212, the video player 108 begins playing the video production until a cue point is triggered in step 214. Upon triggering the cue point, execution proceeds to step 216 wherein the video player generates and transmits to the ad server 106 a request via HTTP POST requests for an ad, and includes with the request a cue point name and video ID into which the ad will be placed. The following exemplifies a request generated at step 216:

```
FLVPlayback.addEventlistener(Video.CuePoint, function( ) {
Var request = new
URLRequest("filename.php?func=advertisment&movie_id=
"+movie_id+"&cue_point=" + this.cuePointName);
}
```

In step 218, the ad server 106 receives the ad request and, in step 220, the ad server 106 locates the requested ad and transmits the ad to the video player 108. The ad requests are made form the player application via HTTP POST requests. The response from the ad server or other database will be a small XML, that gives the path of the ad, length, and any other information that's related to the ad. The player reacts to events signaled by the cue points request and will execute actions defined inside the event trigger instructing the player with the ad parameters, e.g., kind of ad file requested, the action to take, e.g., pause, lifespan, effect, specifics coordinates of the over-laid ad, and the like, as well as any other custom defined configurations.

The following exemplifies simple cue point metadata, which is generated by the video editor 102 and stored with the advertisement:

| TIME | CUE POINT NAME | ACTION | DURATION | URL PATH |
|---|---|---|---|---|
| 1:54.02 | soda_can | Fade In | 10 sec. | http://yoururl.com/ad |
| 2:02.06 | pizza_box | Motion Path | 10 sec. | http://yoururl.com/ad |
| 9:02.04 | sneakers | Glow | 5 sec. | http://yoururl.com/ad |

In step 222, the video player receives the ad with an interactive link which a user/viewer may select and click on to obtain further information about the product being advertised, and optionally purchase same. The ad is then displayed as either or both an ad with the link as an overlay on the video production in step 224, or in step 226 as a calling cue point for the ad and link in an icon or logo in a timeline below the video production. In step 224, the ad is displayed for the duration indicated in the cue point data, as exemplified above. The icon or logo in the timeline of step 226 may remain in the timeline as long as space permits, that is, until space is needed for a icon or logo of a subsequent icon or logo.

In step 228, a determination is made whether the video production is complete. If the video production is not complete, execution returns to step 212; otherwise, execution is terminated as step 230.

Figure 15:
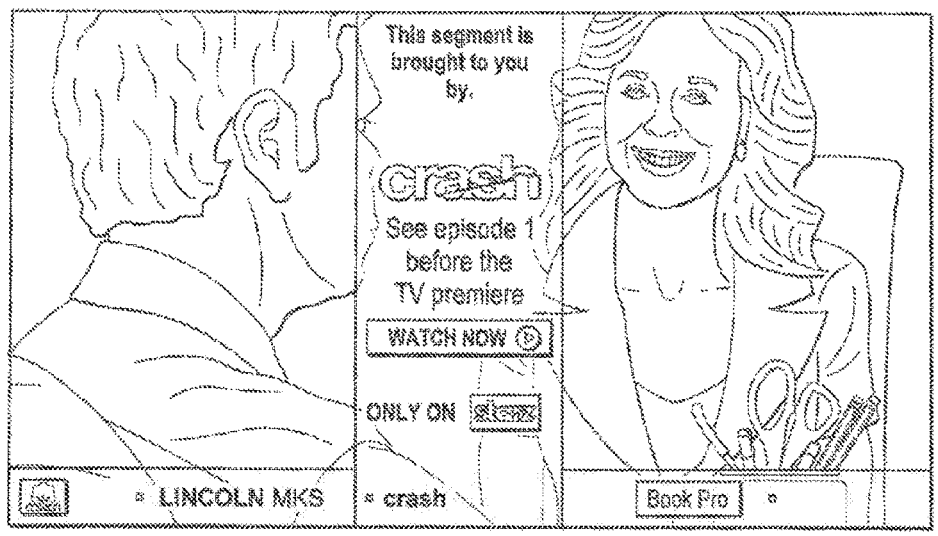
FIG. 15 exemplifies a product placement timeline embodying features of the present invention.
Figure 16:
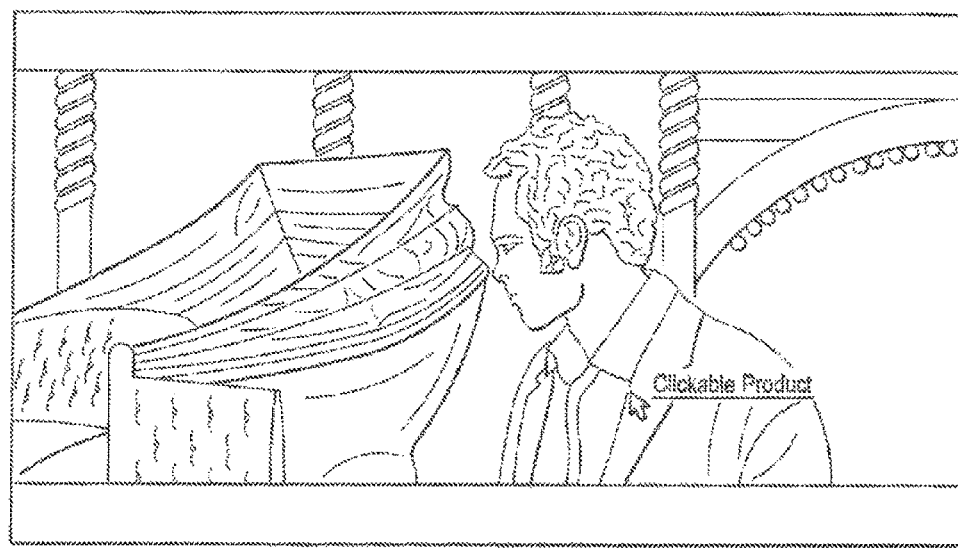
FIG. 16 exemplifies an interactive product placement embodying features of the present invention.

FIGS. 15 and 16 provide additional visual examples of interactive overlay and timeline ads, in which the video player 108 seeks cue points set in the video content triggering an ad event requesting either a timeline advertisement or an embedded live overlay advertisement. More specifically, FIG. 15 exemplifies how timeline information and advertisement offers directly correspond to cue points inside specific video content assets. FIG. 6 exemplifies how cue points trigger pre-defined advertising events stored and indexed with metadata in the ad server or other database. An example of the event may include the extraction of a single video frame or a series of frames of a video production, which in turn becomes the interactive advertisement that is laid over the video production to create a seamless interactive clickable video ad. As shown in FIG. 16, the product being advertised is highlight via rotoscoping, and additional information may be obtained about by clicking on the product.

By the use of the present invention, an improved method is provided for advertising products by interactively placing them either in a timeline or embedding them in a live overlay on a video production.

It is understood that the present invention may take many forms and embodiments. Accordingly, several variations may be made in the foregoing without departing from the spirit or the scope of the invention. For example, the compositing of elements otherwise non-existing into the finished advertising product or filming green screen products and services into the production to later composite via the video editing application. Means for interconnecting components of the system may be achieved other than via the Internet, such as via fiber optic or cable network or satellite. The video stream may be supplied by alternative means incorporating, for example, DVD technology.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A processor-implemented method, comprising:
defining a cue point data structure including cue point metadata that (1) identifies a start point at which an advertising event is to be presented during a presentation of a base media and (2) includes a pointer to data associated with the advertising event;
associating the cue point data structure with the base media; and
sending a signal representing the cue point data structure to a media player such that presenting the base media causes:
a calling cue point to be displayed in a media timeline,
an interactive visual representation of the advertising event indicated by the pointer in the cue point metadata to be displayed in association with the calling cue point while the base media is presented, the interactive visual representation configured to, upon user interaction, perform an executable function associated with the advertising event data, and
an e-commerce transaction of a product or service related to the advertising event to be processed based on user interaction with an object within the visual representation of the advertising event data.

2. The processor-implemented method of claim 1, wherein:
the cue point metadata includes an indication of a duration such that the signal representing the cue point data structure causes the calling cue point and the visual representation of advertising event data to be displayed for the duration.

3. The processor-implemented method of claim 1, further comprising:
receiving a user request to display the base media, the signal representing the cue point data structure is sent based on receiving the user request.

4. The processor-implemented method of claim 1, wherein the signal representing the cue point data structure is sent to the media player separately from the base media.

5. The processor-implemented method of claim 1, wherein the cue point data structure is sent to the media player in a first format, the processor-implemented method further comprising:
sending the media presentation to the media player in a second format, such that the first format of the cue point data structure is distinct from the second format of the media presentation.

6. The processor-implemented method of claim 1, wherein the signal representing the cue point data structure is sent to the media player such that presenting the base media causes the calling cue point to be displayed in the media timeline at a location that is based on the start point at which the advertising event is to be presented.

7. The processor-implemented method of claim 1, wherein the cue point metadata identifying the start point at which the advertising event is to be presented during the presentation of the base media is dissociated from the presentation of the base media.

8. The processor-implemented method of claim 1, wherein the cue point metadata further includes a motion path action associated with the advertising event data.

9. The processor-implemented method of claim 1, wherein the advertising event data is associated with the at least one product or service.

10. The processor-implemented method of claim 1, further comprising:
presenting, to a user, an editor configured to present the base media and one or more advertising elements associated with the advertising event;
receiving, from the user and via the editor, motion-input defining motion of at least one of the one or more advertising elements; and
storing the motion-input in the cue point data structure.

11. A non-transitory computer readable medium comprising instructions for associating a base media with one or more cue points that trigger an advertising event, the instructions when executed causing at least one processing device to:
- define a cue point data structure including cue point metadata that (1) identifies a start point at which advertising material is to be displayed during a presentation of a base media and (2) includes a pointer to the advertising material;
- store the cue point data structure independently from the base media; and
- associate the cue point data structure with the base media such that playing the base media causes:
  - an interactive visual representation of the advertising material indicated by the pointer to be displayed in association with the calling cue point while the base media is presented, the interactive visual representation configured to, upon user interaction, perform an executable function associated with the advertising event data, and
  - an e-commerce transaction of a product or service related to the advertising event to be processed based on user interaction with an object within the visual representation of the advertising material.

12. The non-transitory computer readable medium of claim 11, further comprising instructions that when executed cause the at least one processing device to:
- display the visual representation of the advertising material indicated by the pointer in the cue point metadata for a duration indicated in the cue point metadata.

13. The non-transitory computer readable medium of claim 11, further comprising instructions that when executed cause the at least one processing device to:
- receive a user request to display the base media; and
- display the base media based on the user request.

14. The non-transitory computer readable medium of claim 11, further comprising instructions that when executed cause the at least one processing device to:
- send the cue point data structure to a media player; and
- send the base media, separate from the cue point data structure, to the media player.

15. The non-transitory computer readable medium of claim 11, further comprising instructions that when executed cause the at least one processing device to:
- send the cue point data structure to a media player in a first format; and
- send the base media to the media player in a second format, such that the first format of the cue point data structure is independent of the second format of the base media.

16. The non-transitory computer readable medium of claim 11, wherein the cue point data structure further includes at least one motion path action associated with the corresponding advertising event data.

17. The non-transitory computer readable medium of claim 11, further comprising instructions that when executed cause the at least one processing device to:
- present an editor to a user, the editor configured to display the base media and one or more advertising elements associated with the advertising event, the editor configured to receive input from the user defining motion of at least one of the one or more advertising elements and store information defining the motion in the cue point data structure.

18. A processor-implemented method, comprising:
- receiving, from one or more first servers, a base media to a media player, at least one of a product or a service displayed during presentation of the base media by the media player;
- receiving, from one or more second servers different from the one or more first servers, a cue point data structure associated with the base media to the media player, the cue point data structure including cue point metadata that identifies a start point at which an advertising event is to be presented in the base media and including a pointer to data associated with the advertising event; and
- associating the cue point data structure with the base media such that playing the base media causes:
  - a calling cue point to be displayed in a media timeline,
  - an interactive visual representation of the advertising event indicated by the pointer in the cue point metadata to be displayed in association with the calling cue point while the base media is presented, the interactive visual representation configured to, upon user interaction, perform an executable function associated with the advertising event data, and
  - an e-commerce transaction of the product or the service to be processed based on user interaction with an object within the visual representation of the advertising event data.

19. The processor-implemented method of claim 18, further comprising instructions that when executed cause the at least one processing device to:
- present an editor to a user, the editor configured to display the base media and one or more advertising elements associated with the advertising event, the editor also configured to receive input from the user defining motion of at least one of the one or more advertising elements and store information defining the motion in the cue point data structure.

20. A processor-implemented method, comprising:
- receiving a playback request for a video production from a video player, the video production at least one of a product or a service displayed during display of the video production by the video player;
- identifying a cue point data structure associated with the video production, the cue point data structure including cue point metadata that identifies a start point at which an advertising event is to be presented in the video production and including a pointer to data associated with the advertising event; and
- executing the identified cue point data structure, the video player configured such that, for each set of cue point metadata:
  - (a) a calling cue point is displayed in a video timeline associated with the video production,
  - (b) the data associated with the advertising event indicated by the pointer in the corresponding set of cue point metadata is retrieved, and
  - (c) the advertising event is displayed for a duration indicated in the cue point metadata at the start point identified in the cue point metadata, the advertising event displayed in association with the calling cue point while the base media is presented, the interactive visual representation configured to, upon user interaction, perform an executable function associated with the advertising event data.

* * * * *